United States Patent
Huxham et al.

(10) Patent No.: US 10,198,728 B2
(45) Date of Patent: Feb. 5, 2019

(54) METHODS AND SYSTEMS FOR PROVISIONING PAYMENT CREDENTIALS

(71) Applicant: Visa International Service Association, San Francisco, CA (US)

(72) Inventors: Horatio Nelson Huxham, Cape Town (ZA); Alan Joseph O'Regan, Cape Town (ZA); Tara Anne Moss, Cape Town (ZA); Hough Arie Van Wyk, Cape Town (ZA); John Foxe Sheets, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 251 days.

(21) Appl. No.: 14/889,714

(22) PCT Filed: May 15, 2014

(86) PCT No.: PCT/IB2014/061471
§ 371 (c)(1),
(2) Date: Nov. 6, 2015

(87) PCT Pub. No.: WO2014/184771
PCT Pub. Date: Nov. 20, 2014

(65) Prior Publication Data
US 2016/0078434 A1    Mar. 17, 2016

Related U.S. Application Data

(60) Provisional application No. 61/823,840, filed on May 15, 2013.

(30) Foreign Application Priority Data

May 22, 2013  (ZA) ................................. 2013/03719
Aug. 20, 2013  (ZA) ................................. 2013/06249

(51) Int. Cl.
*G06Q 20/00* (2012.01)
*G06Q 20/38* (2012.01)
(Continued)

(52) U.S. Cl.
CPC ......... *G06Q 20/3829* (2013.01); *G06Q 20/18* (2013.01); *G06Q 20/3226* (2013.01);
(Continued)

(58) Field of Classification Search
CPC .................................................. G06Q 20/322
(Continued)

(56) References Cited

U.S. PATENT DOCUMENTS

| 7,752,292 B1 | 7/2010 | Katzer |
| 8,019,365 B2 | 9/2011 | Fisher |

(Continued)

FOREIGN PATENT DOCUMENTS

| KR | 10-2008-0096857 | 11/2008 |
| KR | 10-0869157 B1 | 11/2008 |

(Continued)

OTHER PUBLICATIONS

Notice of Non-Final Rejection dated Sep. 6, 2016 in Korean Patent Application No. 2015-7035390, 6 pages.
(Continued)

*Primary Examiner* — Chinedu C Agwumezie
(74) *Attorney, Agent, or Firm* — Kilpatrick Townsend & Stockton LLP

(57) ABSTRACT

A method and system for provisioning payment credentials usable by a mobile device in conducting a payment. The method is conducted at a provisioning system and comprises the steps of: receiving payment credentials from a receiving device, the payment credentials having been obtained from a portable payment device presented by a consumer at the receiving device; receiving, from the receiving device, an
(Continued)

identifier entered by the consumer; identifying a mobile device or a secure element corresponding to the identifier; and communicating the payment credentials or a derivation of the payment credentials to the identified mobile device or the secure element to be securely stored in association with the mobile device. The method may include: encrypting the received payment credentials, the encrypted payment credentials having a unique decryption key; and wherein communicating a derivation of the payment credentials communicates the unique decryption key.

17 Claims, 12 Drawing Sheets

(51) Int. Cl.
| | | |
|---|---|---|
| *G07F 19/00* | (2006.01) | |
| *G06Q 20/32* | (2012.01) | |
| *G06Q 20/36* | (2012.01) | |
| *G06Q 20/18* | (2012.01) | |
| *G06Q 20/40* | (2012.01) | |

(52) U.S. Cl.
CPC ..... *G06Q 20/3227* (2013.01); *G06Q 20/3229* (2013.01); *G06Q 20/3278* (2013.01); *G06Q 20/36* (2013.01); *G06Q 20/382* (2013.01); *G06Q 20/38215* (2013.01); *G06Q 20/401* (2013.01); *G07F 19/204* (2013.01)

(58) Field of Classification Search
USPC ........................................ 705/75, 78, 79, 71
See application file for complete search history.

(56) References Cited

U.S. PATENT DOCUMENTS

| | | | |
|---|---|---|---|
| 8,365,868 | B2 | 2/2013 | Johnson et al. |
| 8,983,438 | B2 | 3/2015 | Hammad |
| 9,811,819 | B2 | 11/2017 | Hammad |
| 2005/0043997 | A1 | 2/2005 | Sahota et al. |
| 2005/0101295 | A1 | 5/2005 | Rupp et al. |
| 2006/0165060 | A1 | 7/2006 | Dua |
| 2007/0022058 | A1 | 1/2007 | Labrou et al. |
| 2007/0280483 | A1 | 12/2007 | Fu et al. |
| 2008/0126145 | A1 | 5/2008 | Rackley, III et al. |
| 2008/0208681 | A1 | 8/2008 | Hammad et al. |
| 2008/0248815 | A1 | 10/2008 | Busch |
| 2009/0307140 | A1 | 12/2009 | Mardikar |
| 2011/0098023 | A1 | 4/2011 | Hammad |
| 2012/0078735 | A1 | 3/2012 | Bauer et al. |
| 2012/0124394 | A1 | 5/2012 | Brudnicki et al. |
| 2012/0254030 | A1 | 10/2012 | Khan et al. |
| 2012/0300932 | A1* | 11/2012 | Cambridge ........... H04L 9/3234 380/270 |
| 2013/0036048 | A1 | 2/2013 | Campos et al. |
| 2013/0041699 | A1 | 2/2013 | Fisher |
| 2013/0041830 | A1* | 2/2013 | Singh ..................... G06Q 20/12 705/65 |
| 2013/0086373 | A1 | 4/2013 | Rothkopf et al. |
| 2013/0097034 | A1* | 4/2013 | Royyuru ................ G06Q 20/36 705/17 |
| 2013/0132217 | A1 | 5/2013 | Yahn et al. |
| 2013/0317928 | A1 | 11/2013 | Laracey et al. |
| 2014/0101035 | A1* | 4/2014 | Tanner ............... G06Q 20/3278 705/39 |

FOREIGN PATENT DOCUMENTS

| | | |
|---|---|---|
| KR | 10-2012-0088016 | 8/2012 |
| KR | 2012-0123213 A | 11/2012 |
| KR | 10-1210501 B1 | 12/2012 |
| KR | 10-2013-0007498 | 1/2013 |
| KR | 10-2013-0012223 | 2/2013 |
| WO | WO 2002005231 A2 | 1/2002 |
| WO | WO 2010019670 A2 | 2/2010 |
| WO | 2010/073199 A1 | 7/2010 |
| WO | WO 2011074500 A1 | 6/2011 |
| WO | WO 2013048538 A1 | 4/2013 |

OTHER PUBLICATIONS

European Search Report dated Apr. 26, 2016 in European Patent Application No. 14797103.0, 10 pages.
International Search Report dated Aug. 26, 2015 in PCT/IB2014/061471, 3 pages.
"Methods and Systems for Provisioning Multiple Devices", U.S. Appl. No. 61/924,708, filed Jan. 7, 2014.

* cited by examiner

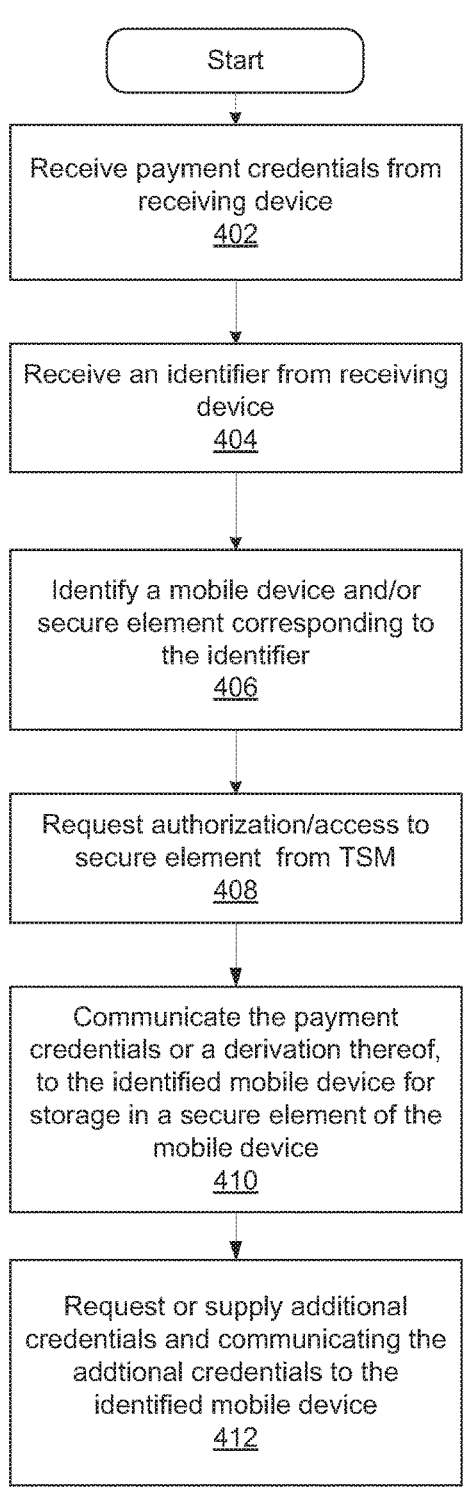
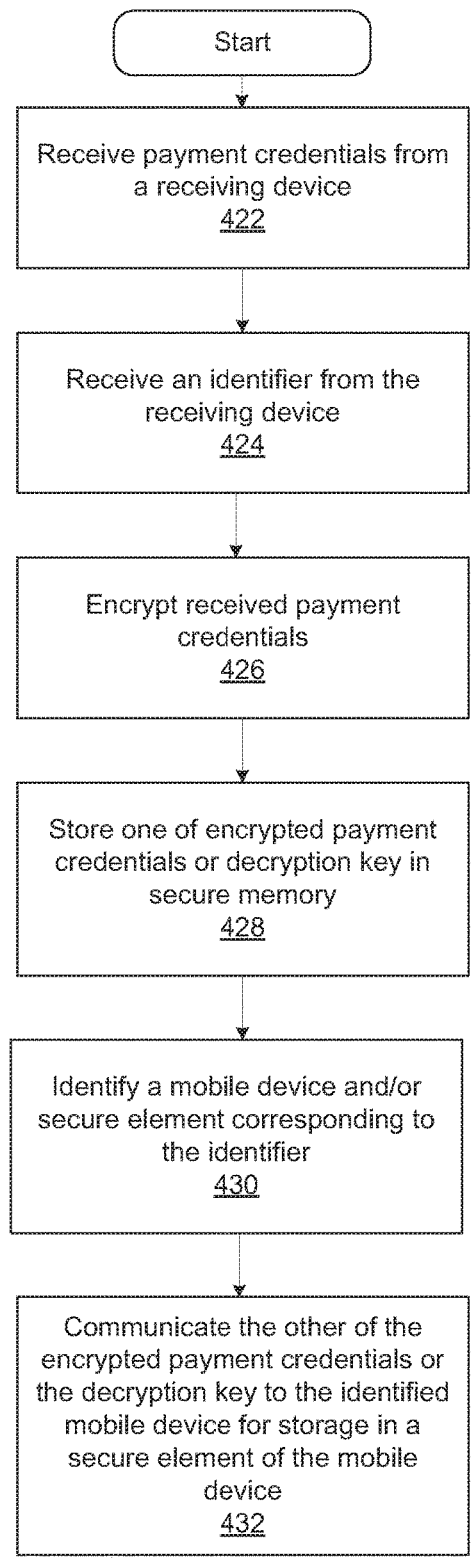
FIG. 4A
FIG. 4B

METHODS AND SYSTEMS FOR PROVISIONING PAYMENT CREDENTIALS

CROSS-REFERENCES TO RELATED APPLICATIONS

This application is a National Stage of International Application No. PCT/IB2014/061471, International Filing Date May 15, 2014, and which claims the benefit of U.S. Provisional Patent Application No. 61/823,840, filed May 15, 2013, South African Patent Application No. 2013/03719, filed May 22, 2013 and South African Patent Application No. 2013/06249, filed Aug. 20, 2013, the disclosures of all applications being incorporated herein by reference.

FIELD OF INVENTION

This application relates to the field of provisioning payment credentials usable by a mobile device.

BACKGROUND

As more merchants are adopting of point-of-sale terminals that are capable of conducting transactions with mobile devices, consumers are more and more likely to replace their physical wallets with digital wallet applications running on their mobile devices (e.g., mobile phones). Transactions with digital wallet applications running on a mobile device may be contactless, for example, using near field communication (NFC) capabilities of the mobile device.

Contactless payment transactions provide significant convenience to consumers as they allow consumers to make purchases more quickly and conveniently than in a contact-based environment. In a contactless payment transaction, a consumer brings a contactless enabled consumer portable payment device (CPPD) such as a contactless smart card or a mobile phone in close proximity with an acceptance terminal. Information such as payment credentials is exchanged between the contactless CPPD and the acceptance terminal in a wireless manner to carry out the payment transaction without requiring direct physical contact between the contactless CPPD and the acceptance terminal. In some cases, the contactless CPPD and the acceptance terminal are not collocated, but may rather be in different locations, for example, in different cities or countries. In such a case the information is transmitted between the contactless CPPD and the acceptance terminal via, for example, the Internet.

It is often required by various standards or compliance authorities that a mobile device being employed as a contactless CPPD contains a secure element. Such a secure element is not unlike a secure integrated circuit used in conventional CPPDs, such as secure integrated circuit credit cards. The secure elements which are in communication with the mobile devices typically provide a secure memory and secure processor which are separate from the mobile device memory and processor and can only be accessed by trusted applications, often only after a specified personal identification number (PIN) has been correctly entered. The mobile devices in which such secure elements are disposed or embedded are often equipped with proximity communications interfaces such as, for example, near field communications (NFC).

It is in this secure memory that information, such as payment credentials, may be stored. In some cases, the provisioning of such payment credentials to the secure memory of the mobile device may be via over-the-air (OTA) communications methods originating from a trusted service manager (TSM). Such TSMs are typically operated from secure data centers such that the process meets security standards imposed by relevant standards or compliance authorities.

Provisioning digital wallet applications on mobile devices can be a cumbersome task. For example, in order to provision a mobile device with the credentials to conduct contactless transactions such as contactless payment transactions, users may be required to access a contactless transaction service provider from their mobile device to carry out an OTA provisioning process. The provisioning process may require the user to manually enter user credentials such as account numbers. As most consumers likely have many credential storage instruments such as credit/debit cards from different banks that the user would like to include in the digital wallet application, entering this information for all credential storage instruments of a user can be a time consuming process. Furthermore, the OTA provisioning process may incur undesirable wireless data usage charges for the user.

Embodiments of the invention aim to address these and other problems individually and collectively, at least to some extent.

BRIEF SUMMARY

According to a first aspect of the present invention there is provided a method for provisioning payment credentials usable by a mobile device in conducting a payment, the method being conducted at a provisioning system and comprising the steps of: receiving payment credentials from a receiving device, the payment credentials having been obtained from a portable payment device presented by a consumer at the receiving device; receiving, from the receiving device, an identifier entered by the consumer; identifying a mobile device or a secure element associated with the mobile device corresponding to the identifier; and communicating the payment credentials or a derivation of the payment credentials to the identified mobile device or the secure element to be securely stored in association with the mobile device.

The method may additionally include: encrypting the received payment credentials, the encrypted payment credentials having a unique decryption key. The payment credentials may be communicated in encrypted form with the unique decryption key being stored at the provisioning system. In one embodiment, communicating a derivation of the payment credentials communicates the unique decryption key and the encrypted payment credentials are stored at the provisioning system. In the case where the unique decryption key is communicated, the unique decryption key may be purged from the provisioning system.

In embodiments of the method, the provisioning system is a remotely accessible server of an issuing authority, a security gateway, or trusted service manager, and wherein communicating the payment credentials or a derivation of the payment credentials to the identified mobile device or the secure element uses a secure channel of communication.

In alternative embodiments of the method, the provisioning system is a kiosk having a processor local to the receiving device, and wherein the method includes: establishing a communication channel between the kiosk and the mobile device for communicating the payment credentials or a derivation of the payment credentials. The kiosk may act as an intermediary for a remotely accessible server and the method may includes using the received identifier to identify and/or verify a user or account at a remotely accessible server.

The method may include: requesting authorization from a trusted service manager to access a secure element; and receiving a security key to access the secure element.

The method may further include: communicating additional credentials to the identified mobile device or the secure element to be securely stored in association with the mobile device, wherein the additional credentials are required in use in addition to the payment credentials or derivation of the payment credentials to carry out a transaction. In one embodiment, the additional credentials may be card verification values. In another embodiment, the additional credentials may be in the form of a dynamic verification application or algorithm for generating dynamic verification values. The method may include obtaining the additional credentials from a remotely accessible server using the identifier and forwarding the additional credentials to the mobile device.

The receiving device may be one of the group of: a card reader associated with a kiosk, a point of sales device, an automated teller machine, a merchant point of sales terminal, or a personal PIN entry device (PPED).

The portable payment device may be one of the group of: a magnetic stripe credit or debit card, a security integrated circuit credit or debit card, a bank card, a contactless bank card, a voucher card, an existing payment credential stored on a mobile device.

The received payment credentials may include receiving one or more of track 1 data, track 2 data, track 3 data and track 2 equivalent data. The received payment credentials may include one or more of the group of: track data, an account number, account holder name and/or date of birth, a bank identification number (BIN), a primary account number (PAN), a service code, an expiration date, card verification values (CVV1 or CVV2), personal details of an account holder, a PIN block or offset, a bank account number, a branch code, a loyalty account number or identifier, credit and/or debit card number information, account balance information.

The identifier may be one or more of the group of: a mobile station international subscriber directory number (MSISDN), an email address, a social network identifier, a predefined consumer name, a consumer account number.

The step of receiving payment credentials and the step of receiving an identifier may include receiving a single secure transaction message containing the payment credentials and the identifier. The secure transaction message may be one of the group of: a payment processing network message, a financial transaction message, a financial transaction message in the form of an ISO8583 message, a financial transaction message containing a server routing code. The server routing code may be used to route the financial transaction message to the remotely accessible server by a payment processing network.

Identifying a mobile device or a secure element corresponding to the identifier may include: determining whether or not a mobile device or secure element corresponding to the identifier has been registered with a remotely accessible server and, if the mobile device or has been registered, identifying a corresponding communication address of the mobile device and/or secure element.

Further features provide for the step of identifying a mobile device corresponding to the identifier to include the step of using the identifier to query a database so as to obtain a communication address of the mobile device associated with the identifier. Further features provide for the step of communicating the payment credentials to the mobile device to include communicating the payment credentials to the mobile device using the communication address.

Communicating the payment credentials or a derivation of the payment credentials to the identified mobile device to be securely stored in association with the mobile device, may include: communicating the payment credentials or a derivation of the payment credentials to the mobile device to be stored in a secure element, wherein the secure element is one of the group of: a secure element provided in the mobile device, a secure element embedded in a layer which sits between a communication component of the mobile device and a communication component interface of the mobile device, a secure element provided in a communication component of the mobile device, a cloud-based secure element associated with the mobile device. In one embodiment, the secure element may be embedded in a label, card or tray and which sits in between a communication component of the mobile device and a communication component interface of the mobile device.

The method may be repeated for multiple payment credentials to be securely stored in association with a single mobile device.

The method may be used for transferring payment credentials to a second mobile device from their existing secure storage on a first mobile device, wherein the portable payment device is an existing payment credential securely stored on the first mobile device.

According to second aspect of the present invention there is provided a method for provisioning payment credentials usable by a mobile device in conducting a payment, the method being conducted at a point of sales device and comprising the steps of: obtaining payment credentials from a portable payment device presented by a consumer at a receiving device; receiving an identifier entered by the consumer into the point of sales device; communicating the payment credentials and identifier to a remotely accessible server for further communication of the payment credentials or a derivation of the payment credentials to a mobile device or a secure element to be securely stored in association with the mobile device.

According to a third aspect of the present invention there is provided a system for provisioning payment credentials usable by a mobile device in conducting a payment, including a provisioning system comprising: a payment credentials receiver for receiving payment credentials from a receiving device, the payment credentials having been obtained from a portable payment device presented by a consumer at the receiving device; an identifier receiver for receiving, from the receiving device, an identifier entered by the consumer; an identifying component for identifying a mobile device or a secure element associated with the mobile device corresponding to the identifier; and a communication module for communicating the payment credentials or a derivation of the payment credentials to the identified mobile device or the secure element to be securely stored in association with the mobile device.

The provisioning system may include: an encryption component for encrypting the received payment credentials, the encrypted payment credentials having a unique decryption key; and wherein communicating a derivation of the payment credentials communicates the unique decryption key.

In embodiments of the system, the provisioning system is a remotely accessible server of an issuing authority, a security gateway, or trusted service manager, and wherein the communication module for communicating the payment credentials or a derivation of the payment credentials to the identified mobile device or the secure element uses a secure channel of communication.

In alternative embodiments, the provisioning system is a kiosk having a processor local to the receiving device, and wherein the kiosk includes the communication module for establishing a communication channel between the kiosk and the mobile device for communicating the payment credentials or a derivation of the payment credentials. The kiosk may act as an intermediary for a remotely accessible server and the system includes a server communication module for using the received identifier to identify and/or verify a user or account at the remotely accessible server.

The provisioning system may further includes: an authorization component for requesting authorization from a trusted service manager to access a secure element and receiving a security key to access the secure element.

The provisioning system may further include: an additional credentials component for communicating additional credentials to the identified mobile device or the secure element to be securely stored in association with the mobile device, wherein the additional credentials are required in use in addition to the payment credentials or derivation of the payment credentials to carry out a transaction. In one embodiment, the additional credentials may be card verification values. In another embodiment, the additional credentials may be in the form of a dynamic verification application or algorithm for generating dynamic verification values. The method may include obtaining the additional credentials from a remotely accessible server using the identifier and forwarding the additional credentials to the mobile device.

The identifying component for identifying a mobile device corresponding to the identifier may include functionality for determining whether or not a mobile device or a secure element corresponding to the identifier has been registered with a remotely accessible server and, if the mobile device has been registered, identifying a corresponding communication address of the mobile device or secure element.

The communication module for communicating the payment credentials or a derivation of the payment credentials to the identified mobile device to be securely stored in association with the mobile device, includes functionality for communicating the payment credentials or a derivation of the payment credentials to the mobile device to be stored in a secure element, wherein the secure element is one of the group of: a secure element provided in the mobile device, a secure element embedded in a layer which sits between a communication component of the mobile device and a communication component interface of the mobile device, a secure element provided in a communication component of the mobile device, a cloud-based secure element associated with the mobile device.

In further embodiments, the system may include: a point of sales device comprising: a payment credentials obtaining component for obtaining payment credentials from a portable payment device presented by a consumer at the receiving device; an identifier receiver for receiving an identifier entered by the consumer into the point of sales device; a communication module for communicating the payment credentials and identifier to a remotely accessible server for further communication of the payment credentials or a derivation of the payment credentials to a mobile device to be securely stored in association with the mobile device.

In a further aspect of the present invention, a kiosk is provided to allow a user to provision a mobile device with credentials from the user's credential storage instruments also referred to as portable payment devices. The kiosk includes a credential storage instrument reader to retrieve credentials from a credential storage instrument. The kiosk also includes a mobile device interface to establish a communication channel with a mobile device, and to load credentials from the credential storage instrument onto the mobile device via the communication channel.

According to a fourth aspect of the present invention there is provided a computer program product for provisioning payment credentials usable by a mobile device in conducting a payment, the computer program product comprising a computer-readable medium having stored computer-readable program code for performing the steps of the first aspect of the present invention and one or more additionally defined features listed above.

According to a fifth aspect of the present invention there is provided a computer program product for provisioning payment credentials usable by a mobile device in conducting a payment, the computer program product comprising a computer-readable medium having stored computer-readable program code for performing the steps of the second aspect of the present invention and one or more additionally defined features listed above.

Further features of the invention provide for the computer-readable medium to be a non-transitory computer-readable medium and for the computer-readable program code to be executable by a processing circuit.

In order for the invention to be more fully understood, implementations thereof will now be described with reference to the accompanying drawings.

BRIEF DESCRIPTION OF THE DRAWINGS

FIG. 4A is a flow diagram of a method carried out at a provisioning system in accordance with the present invention;

FIG. 4B is a flow diagram of an embodiment of the method of FIG. 4A;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Methods and systems for provisioning payment credentials or derivations of payment credentials usable by a mobile device in conducting a contactless payment are described.

Embodiments of the invention include a method carried out at a remotely accessible server for provisioning payment credentials or derivations thereof to a mobile device via a receiving device at which a portable payment device or credential storage instrument such as a payment card may be input. The receiving device may be, for example, a point-of-sale device, an automated teller machine, or other intermediary device.

The payment credentials may be provisioned securely to the mobile device from the remotely accessible server via channels to a secure element associated with the mobile device.

The payment credentials may be provisioned to the mobile device or, alternatively, the payment credentials may be stored at the remotely accessible server in an encrypted form and a unique decryption key may be provisioned to the mobile device.

Other embodiments of the invention provide a kiosk to allow a user to provision a mobile device with credentials from the user's credential storage instruments. By providing a kiosk as an interface between the user's mobile device and the user's credential storage instruments, manual input of the credentials can be avoided because such credentials can be read directly from the user's credential storage instruments. Furthermore, the kiosk can act as a communication intermediary between the mobile device and entities involved in the provisioning process such as an issuer or a trusted service manager to avoid wireless data usage on the mobile device during the provisioning process. Thus, embodiments of the present invention provide a convenient and cost-effective way to enable mobile devices with digital wallet applications for use in contactless transactions.

These and additional embodiments are now described in detail.

Figure 1:
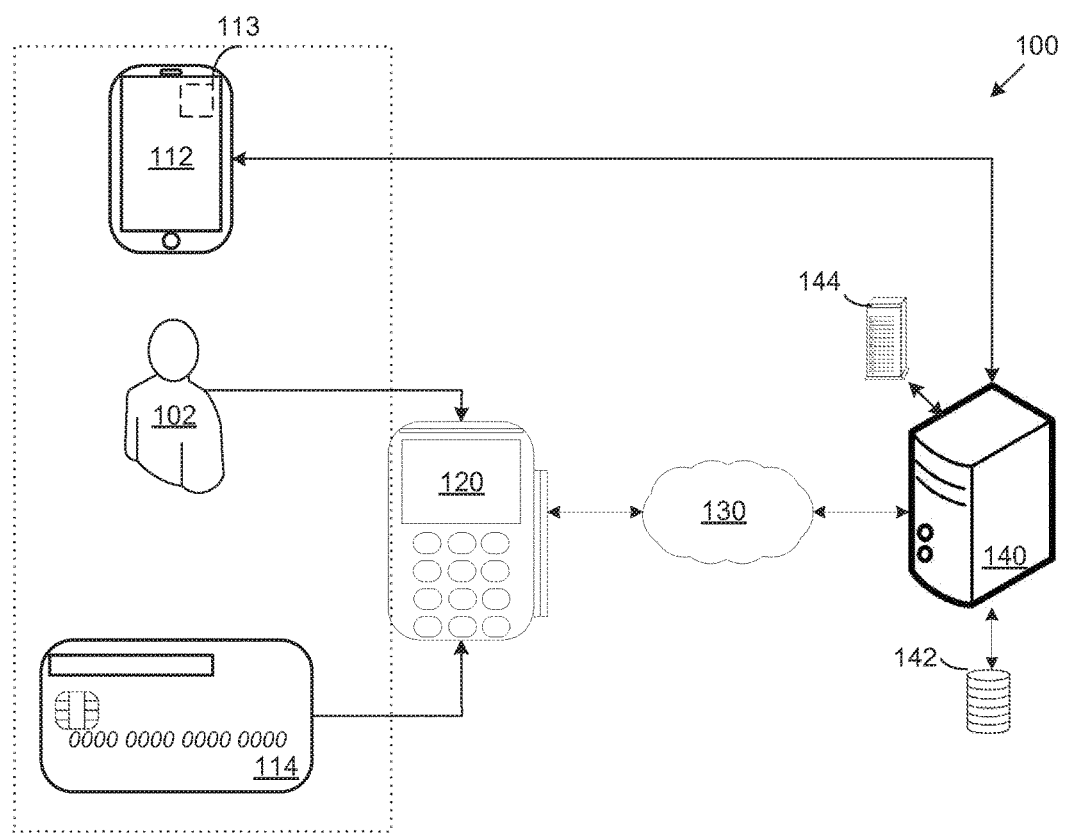
FIG. 1 is a schematic diagram of a first embodiment of a system in accordance with the present invention.

FIG. 1 illustrates a block diagram of an exemplary system (100) according to embodiments of the invention. The system includes a mobile device (112) and a portable payment device (114) of a consumer (102). The system further includes a receiving device for the portable payment device (114) and, in this embodiment, the receiving device is in the form of a point of sales device (120). The system further includes a remotely accessible server (140) which, in the exemplary system (100), is in communication with the point of sales device (120) via a payment processing network (130). While the figure only shows one consumer (102), one mobile device (112), one portable payment device (114) and one point of sales device (120), it will be appreciated that this is purely for illustrative purposes and that the invention anticipates one or more of each.

The mobile device (112) may be any suitable mobile device having a secure element (113). The secure element (113) may be embedded in the mobile device, disposed within a micro secure digital (SD) or similar card form factor which is placed in a micro SD card slot of the mobile device (112).

Alternatively, the secure element (113) may be disposed within a communication component of the mobile device, such as a universal integrated circuit card (UICC). It is also anticipated that in some embodiments the secure element (113) may be disposed in an expansion device which may be connected to a mobile device or alternatively disposed within, for example a label, tray or card which is then placed in between a UICC and a UICC interface of the mobile device such that the secure element can intercept and appropriately process any communication sent between the UICC and the mobile device and consequently, between the mobile device and a mobile communication network.

It is further anticipated that the secure element (113) may be a cloud-based secure element using host card emulation (HCE) which enables network-accessible storage external to the mobile device (112) with an application on the mobile device (112) configured to emulate the card functions.

Exemplary mobile devices include smart phones, feature phones, tablet computers, personal digital assistants, or the like. The mobile device (112) is in data communication with the remotely accessible server over, for example a mobile data or mobile communication network, and is at least configured to securely receive, store, release and transmit payment credentials or derivations of payment credentials. For instance, the mobile device (112) may be any such device which meets any appropriate financial or payment scheme standards, such as, for example, the Global Platform Card Specification. Embodiments of the invention provide for an appropriate mobile software application to be resident on the mobile device (112) which allows a user thereof to interface with the secure element (113) coupled thereto, or associated with it in a cloud-based architecture, and which may also facilitate communications between the mobile device (112) and the secure element (113).

The software application may provide: a user interface to facilitate the entry of a passcode into the mobile device (112) to be compared to an offset stored in the secure element (113); a list from which users can select payment credentials to be used; notifications of receipt or use or payment credentials or the like. The user interface may include a menu from which at least some of these communications can be initiated. Embodiments of the invention further provide for such an interface to be provided by a SIM Application Toolkit protocol (commonly referred to as the STK protocol) implementation or the like.

The portable payment device (114) in the illustrated embodiment is a security integrated circuit bank card. Such cards are also known as 'chip and pin' cards or 'EMV smart cards'. The portable payment device (114) has payment credentials, which may be track 2 and/or track 2 equivalent information (such as EMV tag 57 data), stored therein. Track 2 and track 2 equivalent information may include a bank identification number (BIN), a primary account number (PAN), an expiration date, a service code, discretionary data such as card verification values (CVV) as well as any relevant spacing and redundancy checks. In addition to this, embodiments of the invention provide for the portable payment device (114) to contain payment credentials which may include any one or more of a customer name and/or date of birth, a BIN, a PAN, a service code, an expiration date, CVV1 or CVV2 numbers, a PIN block or offset, a bank account number, a branch code, a loyalty account number or identifier, credit and/or debit card number information, account balance information and/or other consumer information. In other embodiments of the invention, the payment credentials may include track 1 and/or track 3 information.

The point of sales device (120) may be any suitable device configured to obtain payment credentials from appropriate portable payment devices and to communicate these payment credentials to a payment processing network or financial institution network. The point of sales device (120) may be configured to obtain payment credentials from portable payment devices via any appropriate contact or contactless communications interface which may, for example be ISO/IEC 7813, ISO/IEC 7816 or ISO/IEC 14443 standards where applicable.

The point of sales device (120) may include one or more of various means for retrieving information from a portable payment device including the user placing the portable payment device (114) in physical contact with the point of sales device (120), for example, by swiping or inserting a magnetic stripe card into a magnetic stripe reader, or by inserting a chip-card into a chip-card reader slot, or the user placing the portable payment device (114) in close proximity with the point of sales device (120), for example, by placing a contactless card in close proximity to a contactless card reader, or by placing a printed medium, for example, with a bar code or quick response (QR) code in front of an infrared scanner.

In the illustrated exemplary system (100), the point of sales device (120) is a handheld point of sales device. In addition to this, the point of sales device (120) is configured to receive an identifier entered by a consumer via, for example, a keypad of the point of sales device (120).

The point of sales device (120) is further configured to format the payment credentials as well as the identifier into a financial transaction message and to communicate this message to the payment processing network (130). The financial transaction message may, for example, be an ISO 8583 message. Furthermore, the point of sales device (120) is configured to insert a server routing code into the financial transaction message such that the financial transaction message is routed to the remotely accessible server (140) by the payment processing network (130) using the server routing code. The server routing code may be placed in the 'BIN' field of the financial transaction message.

The payment processing network (130) is a network of financial institutions and payment processing institutions and is configured to route financial transaction messages between, for example, merchants, acquirers, and issuers, amongst others. An example of such a payment processing network is VisaNet™ having a plurality of acquiring and issuing financial institutions being a part of the network.

The remotely accessible server (140) may be any appropriate sever computer or distributed server computer system and has a database (142) stored in a digital memory therein and also has a secure memory which, in a preferred embodiment is within a hardware security module (144) of the remotely accessible server. The remotely accessible server (140) is configured to receive payment credentials from a point of sales device (e.g. 120), where the payment credentials have been obtained from a portable payment device (e.g. 114) presented by a consumer (e.g. 102) at the point of sales device (120).

The remotely accessible server may be configured to encrypt the payment credentials, the encrypted payment credentials having a unique decryption key. The encryption may be performed in the hardware security module (144). In one embodiment, the key to decrypt the payment credentials is kept by the remotely accessible server (140) and the encrypted payment credentials are sent to the mobile device (112) for storage in the secure element (114) associated with the mobile device (112). In another embodiment, the encrypted payment credentials are stored in the hardware security module (144) of the remotely accessible server (140) and the decryption key is sent to the mobile device (112) for storage in the secure element (113) associated with the mobile device (112).

In addition to this, the remotely accessible server (140) is configured to receive an identifier from the point of sales device (120) which is entered by the consumer (102) into the point of sales device (120). The remotely accessible server (140) is configured to then identify a mobile device (e.g. 112), or a secure element (113) associated with a mobile device (112), corresponding to the identifier and to communicate the payment credentials to the mobile device (112) to be stored in a secure element (113) associated with the mobile device (112).

This may be performed by using the identifier to query the database (142) so as to obtain a communication address of the mobile device (112) associated with the identifier. The payment credentials can then be sent to the mobile device (112) using the communication address. The identifier received by the remotely accessible server may be, for example, any one or more of a mobile station international subscriber directory number (MSISDN), an email address, a social network identifier, a predefined consumer name, a consumer account number or the like. The communication address of the mobile device may similarly be, for example, any one or more of an MSISDN, an email address, a social network identifier, a predefined consumer name, a consumer account number or the like. The identifier and communication address may be the same.

Embodiments of the invention provide for the remotely accessible server to be configured to associate one or more of the group of: the identifier; decryption key; encrypted payment credentials; and communication address with a user profile in the database.

In some embodiments of the invention the role played by the remotely accessible server (140) may be similar to that of a trusted service manager (TSM) and accordingly may meet any security or data integrity requirements imposed by relevant financial or payment scheme standards, such as, for example, the Global Platform Card Specification.

In use, a consumer (102) may wish to provision his or her payment credentials or a derivation thereof to a secure element (113) on his or her mobile device (112) such that the mobile device (112) may be used to conduct contactless payments at either brick-and-mortar merchants or online merchants.

To do this, the consumer, having already registered his or her mobile device (112) with the remotely accessible server (140) and associated it with an identifier and communication address, visits, for example, a brick-and-mortar merchant and presents the merchant with his or her portable payment device (114). The portable payment device (114) is interfaced with a point of sales device (120) of the merchant and a 'credential transfer' menu option, for example is selected on the point of sales device (120). The consumer (102) may be prompted to enter a PIN which he or she enters into the point of sales device (120), following which, the consumer (102) may be prompted to enter his or her identifier. The consumer (102) enters their predetermined identifier, which has been registered with the remotely accessible server (140), into the point of sales device (120).

Having received the consumer's PIN, the point of sales device (120) is able to extract payment credentials from the portable payment device (114). The point of sales device (120) formats the payment credentials into a financial transaction message. The point of sales device (120) may also include the identifier in the financial transaction message as well as a server routing code. The server routing code may be similar to a BIN and ensures that the financial transaction message is routed to the remotely accessible server (140) by the payment processing network (130).

The financial transaction message is received at the remotely accessible server (140). The remotely accessible server uses the identifier contained in the financial transaction message to identify a communication address of an associated mobile device (112). The remotely accessible server (140) uses the communication address to communicate the payment credentials or a derivation of the payment credentials to the mobile device (112) for storage in the secure element (113) associated therewith.

The payment credentials are then received by the mobile device (112) and stored securely in the secure element (113) of the mobile device (112). The user may be prompted for a PIN before the payment credentials are stored in the secure element. In some embodiments the payment credentials are provisioned to the mobile device (112) from the remotely accessible server (140) and stored in the secure element (113) via over-the-air (OTA) provisioning. This accordingly may enable the user to make contactless payments using his or her mobile device (112) as a contactless portable payment device, where the credentials provided by the mobile device (112) to the merchant's appropriately configured point of sales device are those of the user's portable payment device (114).

In some embodiments, the remotely accessible server (140) may encrypt the payment credentials and a unique decryption key may be associated with the payment credentials. One of either the encrypted payment credentials or the decryption key may then be stored in secure memory, such as a hardware security module (144) of the remotely accessible server. The other of the encrypted payment credentials or the decryption key may be sent to the secure element (113) associated with the mobile device (112). The payment credentials may be encrypted using any appropriate encryption algorithm such that, once encrypted, the payment credentials may only be decrypted using the unique decryption key. If the decryption key is sent to the mobile device (112) for storage in the secure element (113), this decryption key is not stored at the remotely accessible server nor in its hardware security module.

The encrypted payment credentials or decryption key received by the mobile device (112) are stored securely in the secure element (113) of the mobile device (112). The user may be prompted for a PIN before the encrypted payment credentials or decryption keys are stored in the secure element. In some embodiments decryption keys are provisioned to the mobile device (112) from the remotely accessible server (140) and stored in the secure element (113) via over-the-air (OTA) provisioning.

In the scenario of the derivation of the payment credentials in the form of a decryption key is stored at the secure element (113) associated with the mobile device (112), a user may present the identifier to a merchant as a payment method in conducting a transaction. The merchant can request payment credentials from the remotely accessible server (140) and, in conjunction, communicate the identifier to the remotely accessible server (140). The remotely accessible server (140) can use the received identifier to identify a mobile device (112) and request a decryption key from the identified mobile device (112). The mobile device (112), upon receiving this request, may then prompt the user for a PIN, passcode or password before communicating a relevant decryption key to the remotely accessible server (140) so that corresponding encrypted payment credentials can be decrypted and communicated to the merchant and/or the merchant's acquirer, and/or the payment processing network so that the transaction may be completed.

Figure 2:
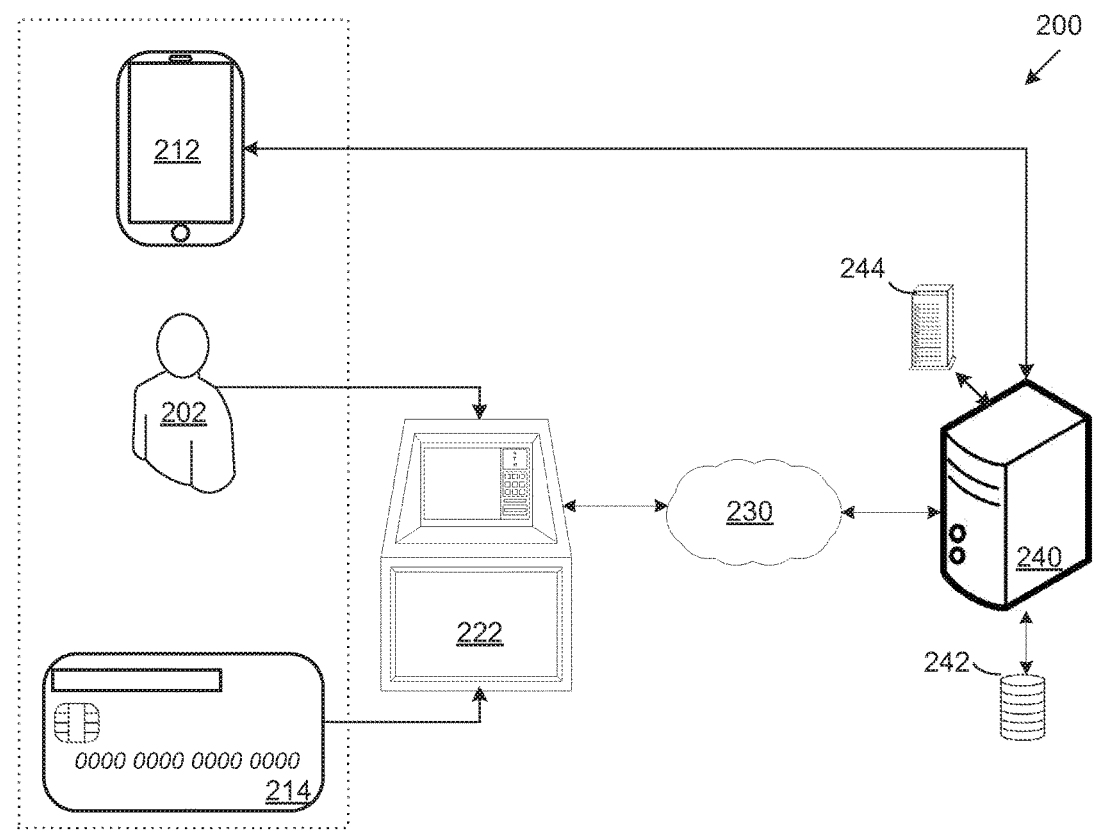
FIG. 2 is a schematic diagram of showing variations to the first embodiment FIG. 1.

FIG. 2 illustrates an exemplary system (200) according to a second embodiment of the invention. The system is similar to that which is illustrated in FIG. 1 and like reference numerals refer to like systems, entities or devices. The system (200) of FIG. 2 differs from that of FIG. 1 in that the point of sales device in this embodiment is an automatic teller machine (ATM) (222). The ATM (222) may be any suitable ATM and is configured to obtain payment credentials from a portable payment device (214) of a consumer (202) and to communicate these payment credentials to a payment processing network (230) or financial institution network. The ATM (222) may be configured to obtain payment credentials from the portable payment device (214) via any appropriate contact or contactless communications interface, for example a card reader or near field communication (NFC) interface.

The ATM (222) in the illustrated embodiment is configured to receive an identifier entered by a consumer (202) via, for example, a keypad of the ATM (222). The ATM (222) is further configured to format the payment credentials as well as the identifier into a financial transaction message and to communicate this message to the payment processing network (230). The financial transaction message may, for example, be an ISO 8583 message. Furthermore, the ATM (222) is configured to insert a server routing code into the financial transaction message such that the financial transaction message is routed to the remotely accessible server (240) by the payment processing network (230) using the server routing code. The server routing code may be placed in the 'BIN' field of the financial transaction message.

Once the payment credentials are received at the remotely accessible server, they may communicated or a derivation of the payment credentials may be communicated to the mobile device for storage in a secure element thereof as has been described in the foregoing description.

The system (200) may be put to use by a user (202) in a similar manner to that system of FIG. 1. The user (202) presents his or her portable payment device (214) to a portable payment device interface of the ATM (222). The user may be prompted for a PIN, responsive to a correct entry of which, the user (202) user selects a 'credential transfer' option from a menu displayed on a screen of the ATM (222). The user (202) will also be prompted for an identifier, which he or she enters into the ATM (222) via keypad of the ATM (222). The ATM (222) obtains payment credentials from the portable payment device (214) and formats the payment credentials, identifier, as well as the server routing code into a financial transaction message which is then sent to the payment processing network (230) and routed from there to the remotely accessible server (240). Similar to the in-use scenario of FIG. 1, the payment credentials are then communicated to the user's mobile device (926) to be stored in a secure element thereof.

Figure 3:
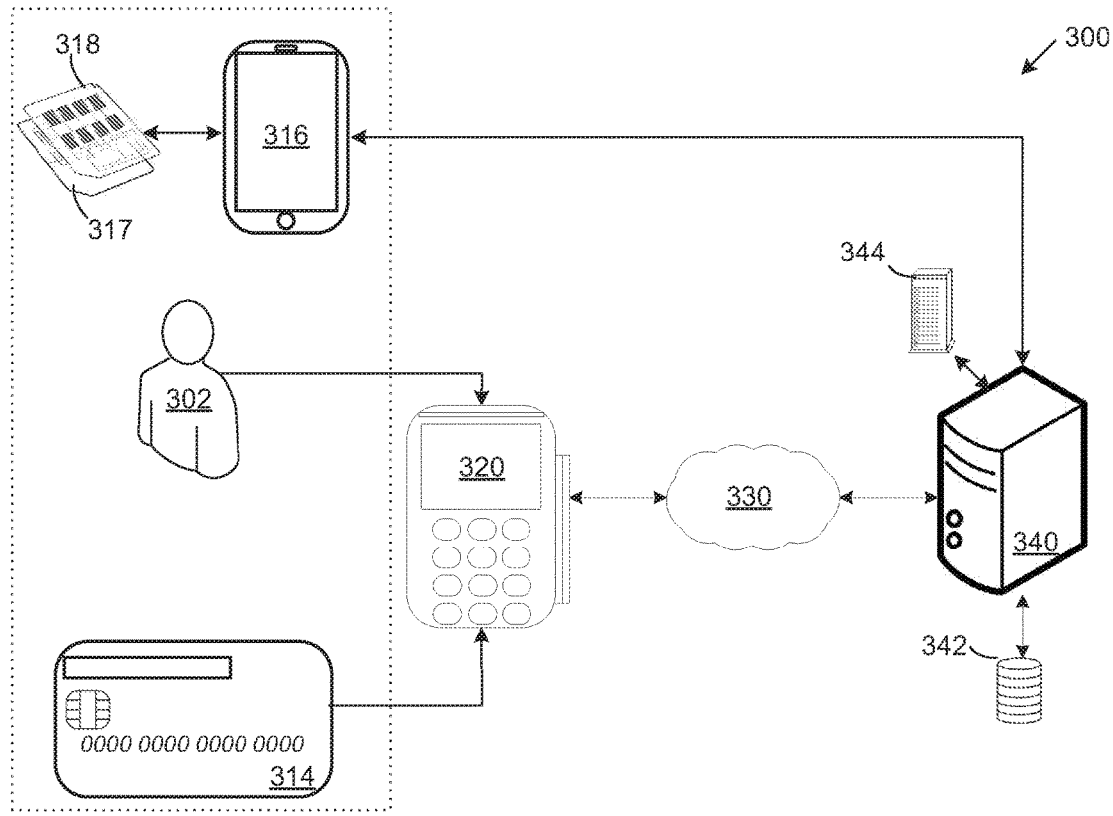
FIG. 3 is a schematic diagram of showing variations to the first embodiment FIG. 1.

FIG. 3 illustrates yet another exemplary system (300) according to a third embodiment of the invention. The system (300) is similar to that which is illustrated in FIGS. 1 and 2, and like reference numerals refer to like systems, entities or devices. The system (300) of FIG. 3 differs from that of FIGS. 1 and 2 in that the mobile device (316) does not have an embedded secure element. Rather, the mobile device (316) has a cryptographic expansion label (318) in which a secure element is disposed. The cryptographic expansion label (318) has electrical contacts disposed on a top side and a bottom side thereof which interface to a communication component (317) and a communication component interface of the mobile device (316) respectively. The cryptographic expansion label (318) may then be attached to the communication component (317) which is inserted into a communication bay of the mobile device (316) such that the secure element can intercept and appropriately process any communication sent between the communication component (317) and the mobile device (316) and consequently, between the mobile device (316) and a mobile communication network. In the illustrated embodiment, the communication component is a universal integrated circuit card (UICC).

FIG. 4A illustrates a flow diagram of a method according to one embodiment of an aspect of the invention. The method is conducted at a provisioning system which may be a remotely accessible server, similar to those described in the foregoing description with reference to FIGS. 1 to 3, or a dedicated kiosk as described further below in relation to FIGS. 9A to 9D.

The method includes a series of steps, a first (402) of which is the step of receiving payment credentials from a receiving device which may be a point of sales device, incorporated into or used in association with a point of sales device, as described with reference to FIGS. 1 to 3, or a credential storage instrument reader of a kiosk with reference to FIGS. 9A to 9D, or another form of receiving device for receiving payment credentials. The point of sales device may, for example, be an automatic teller machine, a merchant point of sales terminal or a personal PIN entry device (PPED).

The payment credentials received from the point of sales device are obtained from a portable payment device (also referred to below in relation to the embodiment of FIGS. 9A to 9D as a credential storage instrument) which is presented by a consumer at the receiving device. The portable payment device may be a credit or debit card which may be any one of a magnetic stripe bank card, a security integrated circuit bank card or a contactless bank card. The payment credentials may be track 1 data, track 2 data, track 3 data or track 2 equivalent data (such as EMV tag 57 data). Furthermore, the payment credentials may include an account holder name and/or date of birth, a bank identification number (BIN), a primary account number (PAN), a service code, an expiration date, card verification values (CVV1 or CVV2), a PIN block or offset, a bank account number, a branch code, a loyalty account number or identifier, credit and/or debit card number information, account balance information, and/or consumer information such as name, date of birth. The payment credentials may be received by the remotely accessible server via a payment processing network.

The method includes a step (404) of receiving an identifier from the receiving device, for example, the point of sales device, or kiosk user input interface. The identifier may be any one or more of a mobile station international subscriber directory number (MSISDN), an email address, a social network identifier, a predefined consumer name or a consumer account number. In a preferred embodiment of the invention, the payment credentials and identifier are received at the remotely accessible server in a financial transaction message, which may, for example, be an ISO8583 message. Furthermore, the financial transaction message may be communicated from the point of sales device to the remotely accessible server via a payment processing network. The financial transaction message may accordingly include a server routing code such that the payment processing network is able to route the financial transaction message to the remotely accessible server.

The method includes a next step (406) of identifying a mobile device and/or a secure element of a mobile device corresponding to the identifier. This step may include the step of determining whether or not a mobile device and/or secure element corresponding to the identifier has been registered with the remotely accessible server and, if a mobile device and/or secure element has been registered, identifying a corresponding communication address of the mobile device and/or secure element. This may be performed by using the identifier to query a database of the remotely accessible server so as to obtain the communication address of the mobile device and/or secure element associated with the identifier.

As an optional additional step (408), a registration or activation request may be sent to a trusted management service (TSM) which manages security keys or tokens that are used to access a secure element. The request may include the identifier. The TSM may authorize the unlocking of a secure element associated with the mobile device. The TSM may be provided at the remotely accessible server or by a remote service provided on a separate remotely accessible server.

The method includes a step (410) of communicating the payment credentials to the mobile device to be stored in a secure element associated with the mobile device. This may include communicating the payment credentials to the mobile device using the communication address. This may also include communicating the payment credentials to the secure element associated with the mobile device using an identification code of a secure element in order to set up a secure channel of communication with the secure element which may be via the mobile device. In some embodiments as described further in relation to FIG. 4B, a derivation of the payment credentials is communicated to the mobile device or secure element, for example, the derivation of the payment credentials may be a decryption key corresponding to remotely stored encrypted payment credentials.

As a further optional additional step (412), additional credentials may be requested by or supplied by the remotely accessible server. The additional credentials may be credentials which cannot be automatically read from a portable payment device such as a printed card verification value (for example the CVV2 number) which is human-readable from the portable payment device. In this case, the additional credentials may be requested by the remotely accessible server and obtained from the consumer via the point of sales device.

The additional credentials may also include dynamic card verification value (dCVV) software that is used to generate a dCVV for individual transactions. Such additional credentials may be identified using the identifier and supplied by the remotely accessible server or by a separate remotely accessible server during the provisioning process. The additional credentials may be communicated to the secure element associated with the mobile device. These may be communicated separately to the payment credentials or derivation of the payment credentials.

The secure element of the mobile device may, according to some embodiments of the invention, be embedded in a label, card or tray as described previously in the forgoing description. Before communicating the payment credentials to the mobile device, the remotely accessible server may encrypt the payment credentials using any one of a number of encryption algorithms. Exemplary encryption algorithms include Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols. In some embodiments, the decryption key, also referred to as the private key, is stored in a secure memory of the remotely accessible server in association with the identifier, such that only the remotely accessible server, or a hardware security module thereof, may decrypt the payment credentials before presentment to, for example, a merchant. In this embodiment, the payment credentials are stored in their encrypted form in the secure element of the mobile device.

FIG. 4B illustrates a flow diagram of a method according to another embodiment of an aspect of the invention. The method is conducted at remotely accessible server, such as that of FIGS. 1 to 3. The method includes a series of steps, a first (422) of which is receiving payment credentials from a receiving device such as point of sales device similar to that of step (402) of FIG. 4A.

The method includes a next step (424) of receiving an identifier from the receiving device such as a point of sales device similar to that of step (404) of FIG. 4A.

The method includes a following step (426) of encrypting the payment credentials. The payment credentials may be encrypted with any appropriate algorithm and once encrypted, have a unique decryption key. Exemplary encryption algorithms include, but are not limited to, Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

As the decryption key is unique to those payment credentials, only that decryption key may be used to decrypt those payment credentials. The unique decryption key, which in some embodiments may be a private key, is not stored in the same location as the encrypted payment credentials.

The method includes a next step (428) of storing one of either the encrypted payment credentials or the decryption key in a secure memory of the remotely accessible server, which in a preferred embodiment, is a hardware security module. The encrypted payment credentials or the unique decryption key, communication address, and identifier may be associated with a user profile stored in a database of the remotely accessible server. Upon receiving, for example, a unique decryption key, the corresponding payment credentials, stored in the hardware security module, may be identified.

The method includes a following step (430) of identifying a mobile device and/or a secure element corresponding to the identifier. This step is similar to step (406) of FIG. 4A.

The method includes a final step (432) of communicating the other of the encrypted payment credentials and the unique decryption key to the mobile device to be stored in a secure element associated with the mobile device. This may include communicating to the mobile device using the communication address. The secure element of the mobile device may, according to some embodiments of the invention, be embedded in a label, card or tray as described previously in the forgoing description.

As only one of the encrypted payment credentials and the decryption key is only stored in the secure element of the mobile device, the encrypted payment credentials cannot be decrypted, and consequently cannot be used.

In the scenario where the encrypted payment credentials are stored at the remotely accessible server and the unique decryption key is transmitted to the secure element of the mobile device, the unique decryption key is purged and not stored at the hardware security module of the remotely accessible server.

This scenario, which may be considered an inverse of one where the payment credentials are stored in the secure element of the mobile device, is advantageous in that if the secure element of the mobile device is compromised, only the decryption keys of encrypted payment credentials can be obtained. Furthermore, in the event that the secure element is compromised, the decryption keys stored therein can simply be revoked, without payment credentials having to be re-issued.

Figure 5:
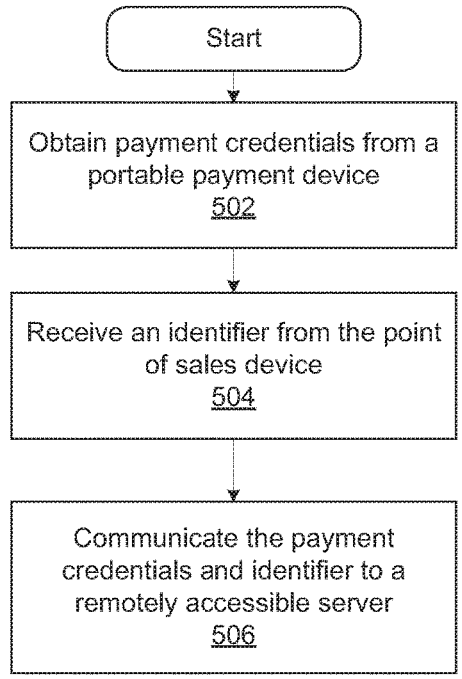
FIG. 5 is a flow diagram of a method carried out at a point of sale device in accordance with the present invention.

FIG. 5 illustrates a flow diagram of a method according to another aspect of the invention. The method is conducted at a suitably modified point of sales device, such as any of those described in the foregoing description with reference to FIGS. 1 to 3.

The method includes a first step (502) of obtaining payment credentials from a portable payment device presented by a consumer at the point of sales device. This may be performed in a manner similar to conventional payment credential access operations, such as for example via an ISO 7816, or ISO/IEC 14443 communication protocol or the like. The payment credentials obtained might be considered as 'card present' payment credentials in that they provide sufficient information for a subsequent transaction using the payment credentials to be considered a card present transaction. The payment credentials may then, for instance, be track 1 data, track 2 data, track 3 data or track 2 equivalent data (such as EMV tag 57 data). Furthermore, the payment credentials may include an account holder name and/or date of birth, a bank identification number (BIN), a primary account number (PAN), a service code, an expiration date, card verification values (CVV1 or CVV2), a PIN block or offset, a bank account number, a branch code, a loyalty account number or identifier, credit and/or debit card number information, account balance information, or consumer information such as name, date of birth.

The method includes a next step (504) of receiving an identifier entered by the consumer into the point of sales device. The identifier may be any one or more of a one or more of a mobile station international subscriber directory number (MSISDN), an email address, a social network identifier, a predefined consumer name or a consumer account number.

The method further includes a next step (506) of communicating the payment credentials and identifier to a remotely accessible server for further communication to a secure element associated with a mobile device of the consumer. This step may include formatting the payment credentials and identifier into a financial transaction message. The financial transaction message may, for example, be an ISO8583 financial transaction message. The point of sales device may further be configured to insert a server routing code into the financial transaction message such that the financial transaction message is routed to the remotely accessible server by a payment processing network and not, for example an issuing bank as indicated by the BIN originally included in the payment credentials.

If requested, additional credentials may be input by the consumer at the point of sales device and communicated to the remotely accessible server, for example, non-machine readable card verification values (for example, CVV2 data).

Figure 6B:
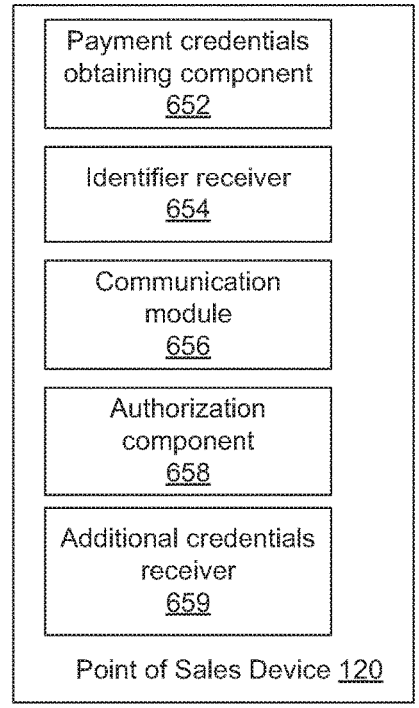
FIG. 6B is a block diagram of an aspect of a system in accordance with the present invention.
Figure 6A:
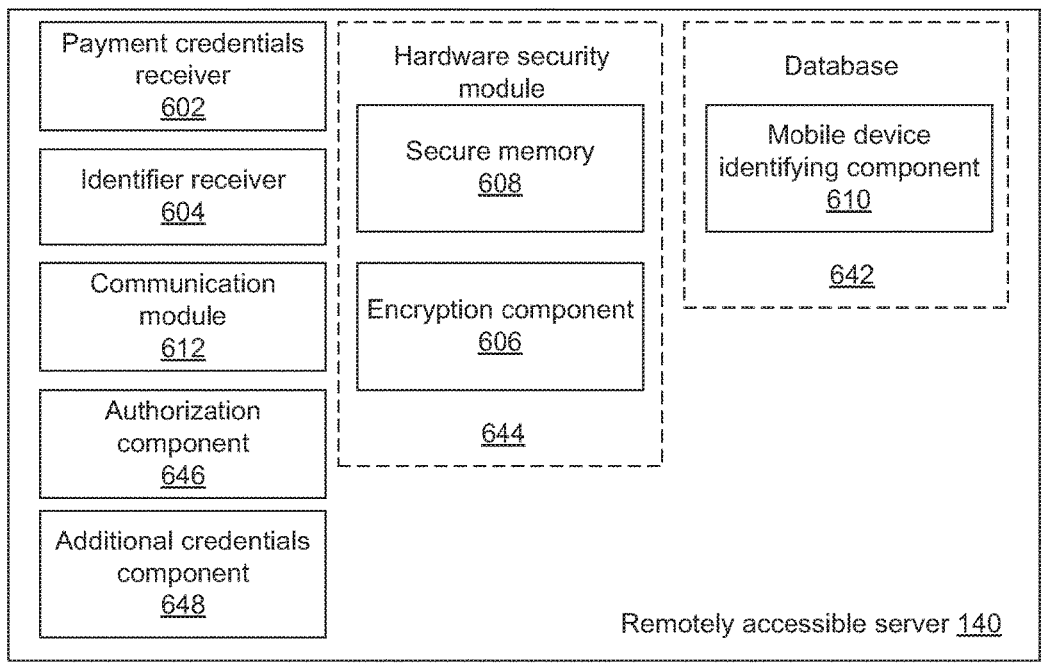
FIG. 6A is a block diagram of an aspect of a system in accordance with the present invention.

A remotely accessible server for provisioning of payment credentials, such as that of FIGS. 1, 2 and 3, is illustrated in FIG. 6A. The remotely accessible server (140) has a payment credentials receiver (602) for receiving payment credentials. The payment credentials may be received from a point of sales device whereat the payment credentials may have been obtained from a portable payment device presented by a consumer. The remotely accessible server (140) has an identifier receiver (604) for receiving, from the point of sales device, an identifier entered by the consumer. In some embodiments the payment credentials receiver (602) and the identifier receiver (604) may be provided in a single receiver which may be configured to receive payment credentials and an identifier in a financial transaction message. In some embodiments, the financial transaction message may be an ISO 8583 message.

The remotely accessible server (140) may include an encryption component (606) for encrypting the received payment credentials, the encrypted payment credentials having a unique decryption key. The remotely accessible server (140) may have a secure memory (608) incorporated therein or associated with the remotely accessible server (140) for storing one of the encrypted payment credentials or the unique decryption key. In the illustrated embodiment, the secure memory (608) and the encryption component (606) are within a hardware security module (644) of the remotely accessible server (140).

The remotely accessible server (140) may include an identifying component (610) for identifying a mobile device and/or secure element corresponding to the identifier. In the illustrated embodiment, the identifying component (610) forms part of a database (642) of the remotely accessible server (140) in which one or more of the group of: an identifier; decryption key; encrypted payment credentials; and communication address may be associated with a user profile.

The remotely accessible server (140) further includes a communication module (612) for communicating to the identified mobile device or the secure element associated with the mobile device. The communication module may communicate with the mobile device via any appropriate mobile communication or mobile data network. The communication module (612) may set up a secure communication channel with the secure element via the mobile device for communication of one of the encrypted payment credentials or the unique decryption key.

The remotely accessible server (140) may optionally include an authorization component (646) for sending a registration or activation request to a trusted management service (TSM) which manages security keys or tokens that are used to access a secure element.

The remotely accessible server (140) may optionally include an additional credentials component (648) for requesting or supplying additional credentials for communicating to the mobile device or the secure element. The additional credentials component (648) may request additional credentials from a consumer via a point of sale device, for example, human-readable card verification values, which are forwarded for storage on the secure element associated with the mobile device. Alternatively or additionally, the additional credential component (648) may supply additional credentials stored at the remotely accessible server or a related remote server, for example, in the form of dynamic card verification value (dCVV) software used to generate a dCVV for individual transactions. The supplied additional credentials may be forwarded for storage on the secure element associated with the mobile device.

A point of sales device for provisioning of payment credentials, such as that of FIGS. 1, 2 and 3, is illustrated in FIG. 6B.

The point of sales device (120) may include a payment credentials obtaining component (652) which may be in the form of a card reader or scanner as previously described. The point of sales device (120) may also include an identifier receiver (654) for receiving an identifier as input by a consumer.

The point of sales device (120) may include a communication module (656) for communication with a remotely accessible server. The communication module (656) may communicate with the remotely accessible server securely using financial transaction messages.

In some embodiments, the point of sales device (120) may include an authorization component (658) for sending a registration or activation request to a trusted management service (TSM) which manages security keys or tokens that are used to access a secure element.

In further embodiments, the point of sales device (120) may include an additional credentials receiver (659) for receiving additional credentials from a consumer, for example, in the form of a printed card verification value which is not obtainable by the payment credentials obtaining component (652).

Figure 7:
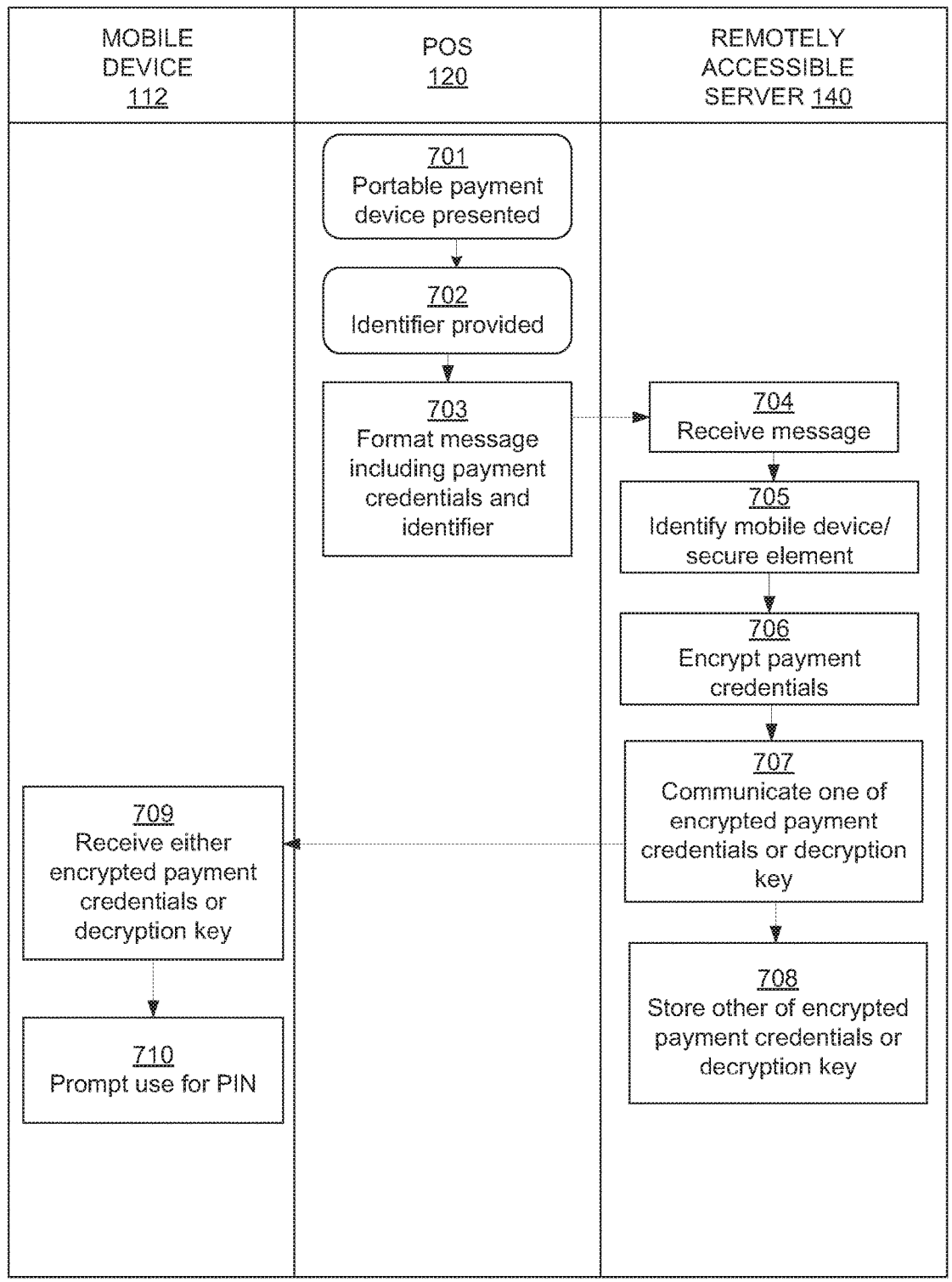
FIG. 7 is a swim-lane flow diagram of an embodiment of a method in accordance with the present invention.

FIG. 7 shows a swim-lane flow diagram illustrating the flow between a mobile device (112), a point of sales device (120), and a remotely accessible server (140) according to embodiments. The remotely accessible server (140) may be provided by a financial institution or service provider. In one embodiment, the remotely accessible server (140) is part of a payment processing network.

A consumer may present (701) his portable payment device (for example, a payment card) at the point of sales device which may extract payment credentials from the portable payment device. The consumer may also provide (702) an identifier. For example, the consumer may present a merchant with his payment card which may be inserted into a point of sales device and a "credential transfer" transaction may be requested. The consumer may be prompted for his payment card PIN which may be entered into the point of sales device via a keypad. The point of sales device may also prompt the consumer for an "alias" which is used as an identifier for the consumer and his mobile device.

The point of sales device may format (703) the extracted payment credentials and the identifier into a transaction message, for example, an ISO8583 message. This message is similar to a normal point of sale transaction message with the addition of the provided identifier. The BIN field may be populated with a payment processing network BIN so that the message is routed to a payment processing gateway instead of an issuer. The consumer's BIN remains provided in the message.

The remotely accessible server receives (704) the transaction message and extracts the payment credentials and the identifier. The identifier is used to identify (705) one or more of: a consumer having a registered mobile device and/or secure element; an account having a registered mobile device and/or secure element; or the mobile device and/or secure element itself.

The remotely accessible server may encrypt (706) the payment credentials and a unique decryption key may be generated specific to the payment credentials. One of the encrypted payment credentials and the unique decryption key may be securely communicated (707) to the secure element associated with the mobile device, whilst the other of the encrypted payment credentials and the unique decryption key may be stored (708) at the remotely accessible server.

The secure element associated with the mobile device may receive (709) either the encrypted payment credentials or the unique decryption key and may prompt the user for a PIN (710), the offset of which is stored in association with the payment credentials or the decryption key such that the payment credentials will only be released by the secure element in the event that the correct PIN is entered.

Figure 8:
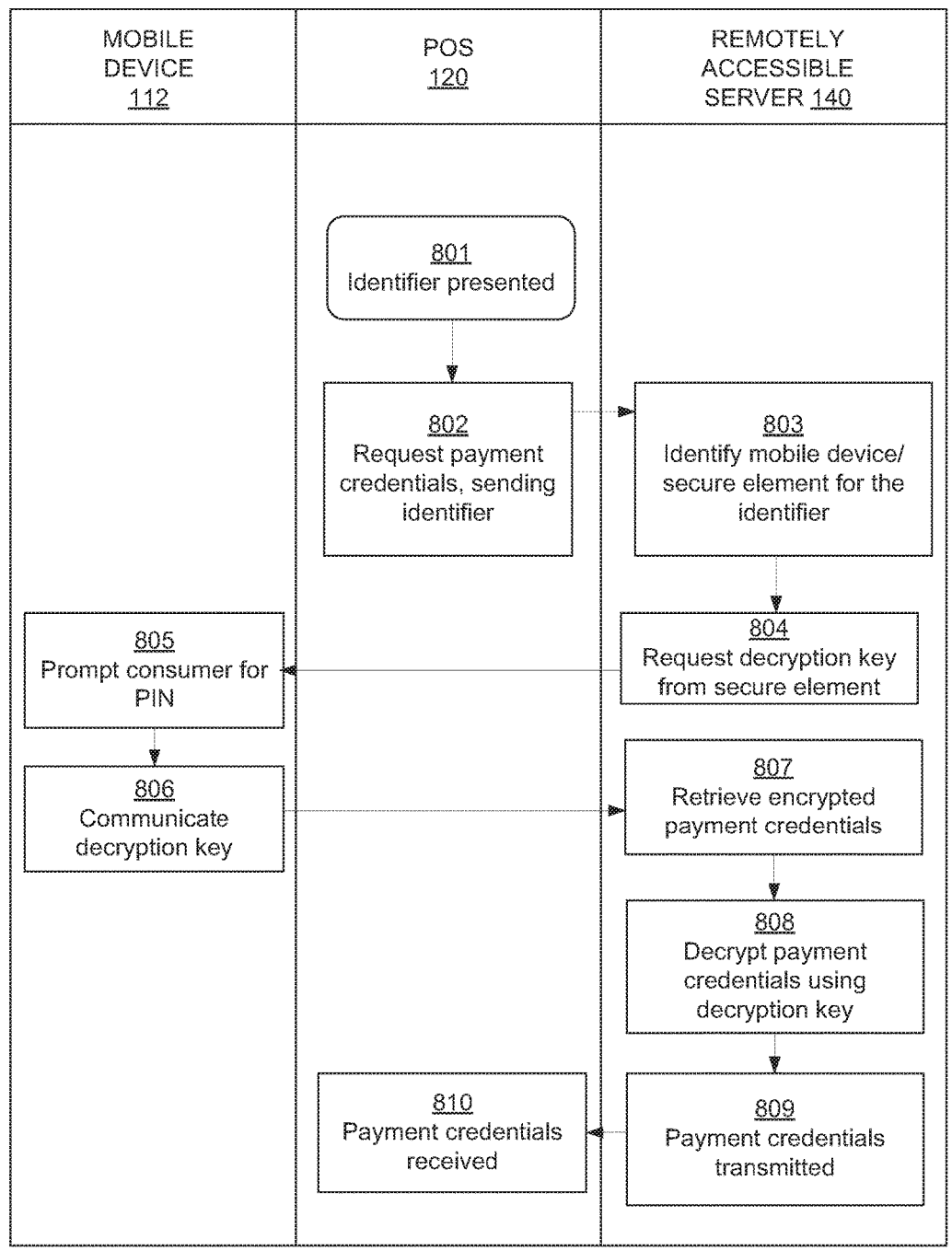
FIG. 8 is a swim-lane flow diagram of another embodiment of a method in accordance with the present invention.

FIG. 8 is a swim-lane flow diagram illustrating the flow between a mobile device (112), a point of sales device (120), and a remotely accessible server (140) according to an embodiment of the described method in which the decryption key for the payment credentials is provisioned to the secure element associated with the mobile device.

A consumer may present (801) an identifier to a merchant as a payment method in conducting a transaction. The merchant may request (802) payment credentials from the remotely accessible server sending the identifier with the request.

The remotely accessible server may use the received identifier to identify (803) a mobile device associated with a secure element at which a decryption key is stored. The remotely accessible server may request (804) the decryption key via a secure communication with the secure element which may be via the mobile device.

The mobile device upon receiving the request may prompt (805) the consumer for a PIN before communicating (806) the decryption key to the remotely accessible server.

The remotely accessible server may retrieve (807) the encrypted payment credentials from its storage and decrypt (808) the payment credentials using the decryption key. The payment credentials may then be transmitted (809) and received (810) at a point of sales device or another intermediary using a secure channel in order to complete the transaction.

An advantage of storing payment credentials, encrypted, at a remotely accessible server instead of in a secure element of a mobile device, according to embodiments of the present invention, is that if the secure element of the mobile device is compromised by a malicious third party and information stored therein is obtained by that third party, the information obtained by the third party will not include payment credentials. This is in contrast to scenarios in which payment credentials are stored in the secure element and where the third party may obtain and fraudulently make use of these payment credentials.

In addition to this, in the event that the secure element is compromised or lost, the decryption keys stored therein can simply be revoked, without payment credentials having to be re-issued.

A further advantage of storing the payment credentials, encrypted, at the remotely accessible server instead of in a secure element of a mobile device is that the mobile device need not meet security standards imposed by relevant standards or compliance authorities. For example, the secure element need not be EMV compliant or may not have to meet PCI DSS requirements.

Similarly as the unique decryption key is stored only in the secure element of the consumer's mobile device, the corresponding encrypted payment credentials cannot be decrypted, and consequently cannot be used, without the decryption key being released from the secure element in which it is securely stored. Thus the consumer has ultimate control over when his or her payment credentials may be used. Furthermore, if the remotely accessible server is compromised by a malicious third party, encrypted payment credentials stored therein will be of no use to that third party without a corresponding unique decryption key.

FIGS. 9A to 9D are now described which illustrate an alternative embodiment of the invention in which the provisioning system is provided by a kiosk (901).

Figure 9A:
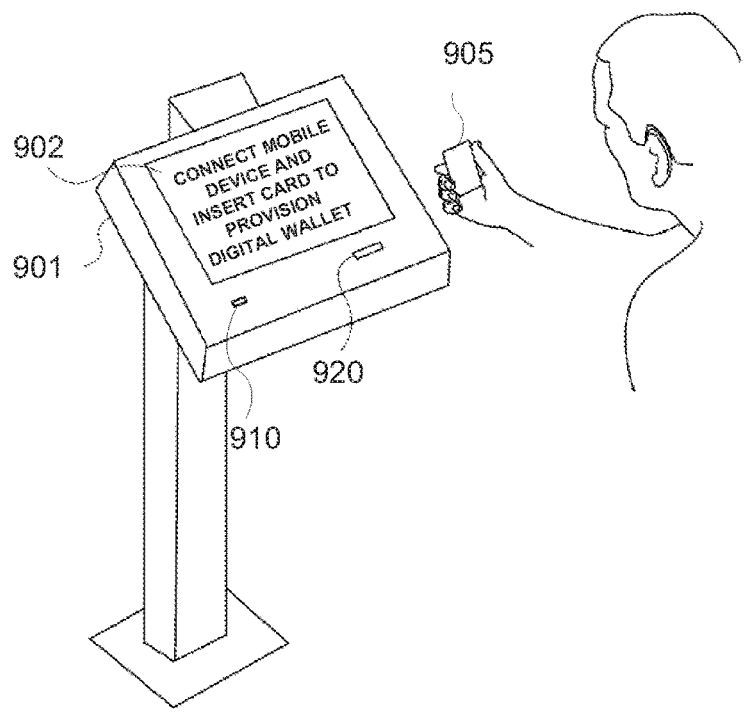
FIG. 9A illustrates a second embodiment of a system in accordance with the present invention.

FIG. 9A illustrates a kiosk (901) which can be set up in retailer stores, shopping malls, airports, and other public places. For example, kiosk (901) can be conveniently set up at a mobile device retailer or a mobile network operator store to allow users to provision their newly purchased mobile device with digital wallet capabilities. In some embodiments, kiosk (901) can be bolted down to the floor or to a wall with tamperproof hardware. Kiosk (901) can also be implemented to be small, light, and compact enough to be portable such that kiosk (901) can easily be moved from location to location. For example, in some embodiments, kiosk (901) can be implemented in a form factor similar to a tablet computer or a laptop.

Kiosk (901) includes a display (902), a mobile device interface (910), and a credential storage instrument reader (920). Display (902) can be surrounded by a housing. Display (902) can be placed at a suitable height (e.g., on a stand) to allow a user to easily read or see information or images provided on display (902). Display (902) can be used to provide instructions to the user during the digital wallet provisioning process. Display (902) can also be used to show advertisements, videos, and/or other images when kiosk (901) is not being used. Display (902) can also act as a user input interface such as touch screen display to accept user inputs.

Mobile device interface (910) is used to establish a communication channel or link between kiosk (901) and a mobile device. A mobile device can be a mobile phone, a personal digital assistant, a tablet computing device, portable media player device, or other suitable portable computing device that can store and run a digital wallet application. Mobile device interface (910) can be a physical connector as shown that can plug into a physical communication port of a mobile device. For example, the physical connector can be a USB connector that can plug into a USB port (e.g., mini-USB) of a mobile device. The physical connector can also be a proprietary connector that is compatible with a proprietary communication port of some mobile device manufacturers. The physical connector can be provided as a plug, as part of a cable (e.g., a retractable cable, an external cable, etc.) that can extend from the housing of kiosk (901), or as part of a docking station or a cradle built into the housing of kiosk (901). In some embodiments, kiosk (901) can include multiple types of connectors such that kiosk (901) can be compatible with a number of mobile device manufacturers. In some embodiments, mobile device interface (910) can be a wireless interface (e.g., wireless transceiver) that is used to establish an ad hoc communication channel with a mobile device using NFC, RF, Bluetooth, Wi-Fi, or other wireless communication protocols during the digital wallet provisioning process. Kiosk (901) may also include one or more physical connectors in combination with one or more wireless interfaces that can be used to establish a communication channel with a mobile device.

Credential storage instrument reader (920) of kiosk (901) is used to read or access a credential storage instrument (905) (also referred to herein as a portable payment device) to obtain credentials and/or other user or account information stored on credential storage instrument (905). Credential storage instrument reader (920) can be a magnetic stripe reader or a chip-card reader to read credentials from credential storage instrument (905) via physical contact with credential storage instrument (905). Credential storage instrument reader (920) can be an infrared scanner such as a bar code or QR code scanner to read credentials that are encoded as an image, or can be a contactless card reader capable of communicating with credential storage instrument (905) via NFC, RF, Bluetooth, Wi-Fi, or other wireless communication protocols to read credentials from credential storage instrument (905) in a contactless manner when credential storage instrument (905) is in close proximity to kiosk (901). In some embodiments, kiosk (901) may include one or more types of credential storage instrument reader described above.

Credential storage instrument (905) can be in the form of a card (e.g., credit/debit or other payment card, identification card, driver's license card, transit card, access card, insurance card, retailer loyalty card, gift card, etc.) or other suitable structure. Credential storage instrument (905) can include a magnetic stripe and/or a memory chip for storing the user's credentials. Credential storage instrument (905) can also be a printed medium that includes an image encoding the user's credentials such as a bar code or a QR code. In some embodiments, credential storage instrument (905) can also be a user's existing mobile device that has the user's credentials stored therein.

Credentials may include information stored on a credential storage instrument that can be used to conduct a transaction with the credential storage instrument. For example, credentials can be information that is used to identify and/or verify the user, or to identify or access an account associated with the credential storage instrument. Credentials may include financial information, identification information, account information, transit information (e.g., as in a subway or train pass), access information (e.g., as in access badges), etc. Some examples of credentials include bank account information, primary account number (PAN), bank identification number (BIN), credit or debit card number, expiration date, name, username, date of birth, driver's license number, address, social security number, passport number, insurance policy number such as medical or auto insurance account number, retailer or travel loyalty program account number, gift card number, transit fare account number, employee identification number, or the like. Credentials may also include additional information that is used to facilitate a transaction. For example, credentials may include a card verification value (CVV) and/or a service code used to facilitate processing of a transaction.

In some embodiments, credentials may also include additional information that are used to facilities a transaction, but are not stored on credential storage instrument (905) or cannot be retrieved by credential storage instrument reader (920) of kiosk (901). For example, credentials may include a card verification value 2 (CVV2) that is printed on the face of a credit card, but may not be retrieved by reading the magnetic stripe of the card. Credentials may also include dynamically card verification code (dCVV) software that is used to generate a dCVV for individual transactions. For such credentials that are not stored on credential storage instrument (905) or cannot be retrieved by credential storage instrument reader (920), kiosk (901) can obtain such credentials from the issuer of credential storage instrument (905) during the provisioning process such that these credentials can be loaded onto the mobile device.

Credentials can be stored in a memory chip of credential storage instrument (905) or can be encoded as an image printed on credential storage instrument (905). Credentials stored in credential storage instrument (905) may also be stored in the form of magnetic data tracks such as those traditionally associated with credits cards. Such tracks may include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

Figure 9B:
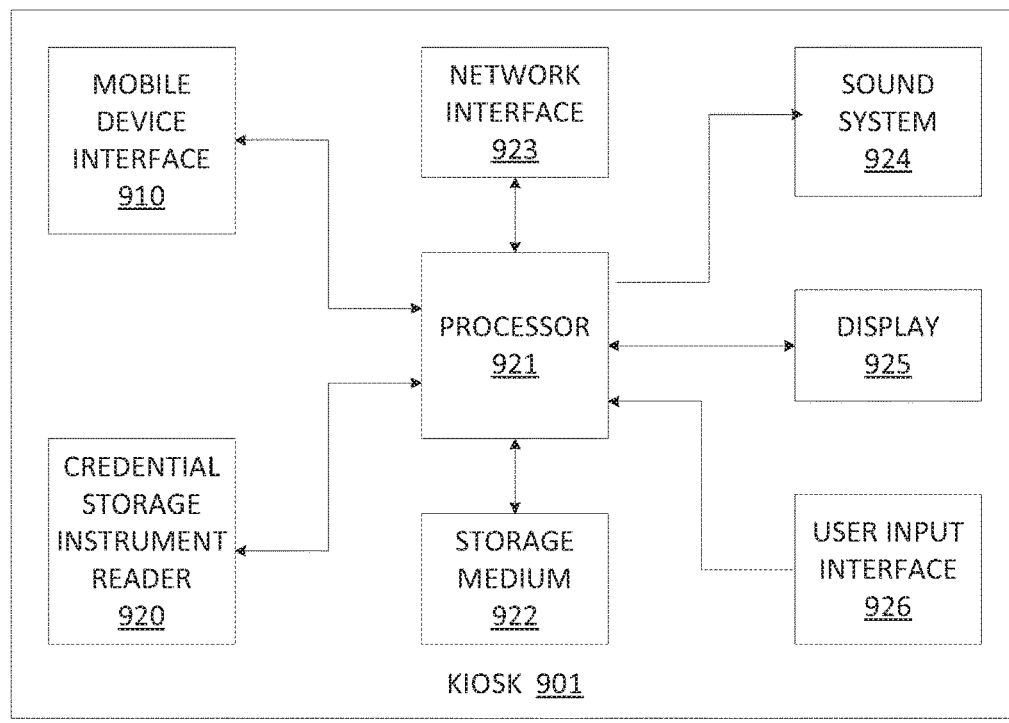
FIG. 9B is a block diagram of a kiosk of the embodiment of the system of FIG. 9A.

FIG. 9B illustrates a block diagram of a kiosk (901) according to various embodiments. Kiosk (901) includes one or more processors (921) coupled to a storage medium (204). Storage medium (204) stores machine readable code that can be executed by processor (921) to provision a mobile device with digital wallet capabilities. Kiosk (901) includes one or more mobile device interface (910) and one or more credential storage instrument reader (920). Kiosk (901) further includes display (925) and sound system (924) that can be used to provide a user with visual and audio instructions during the digital wallet provisioning process. When kiosk (901) is not being used to provision a mobile device, display (925) and sound system 208 can be used to present other media such as advertisements or informational videos and sounds. Kiosk (901) also includes user input interface (926) to receive user inputs. User input interface (926) can be implemented with one or more of a touch screen, a keypad, a keyboard, a touch pad, a mouse, a track pad, a microphone, or other suitable user input interface components.

In some embodiments, kiosk (901) may include a network interface (923) to allow kiosk (901) to communicate, if necessary, with entities that may be involved with the digital wallet provisioning process. For example, network interface (923) may be used by kiosk (901) to communicate with an issuer of the credential storage instrument (e.g., a bank that issued a credit card, a transit agency that issued a transit access card, a government agency that issued an identification card, a retailer that issued a loyalty program card, etc.). Network interface (923) may also be used by kiosk (901) to communicate with a trusted service manager to acquire security keys or tokens that are used to provision a mobile device with digital wallet capabilities. Kiosk (901) may also communicate with a mobile network operator via network interface (923) to verify or access information associated a mobile device. Network interface (923) can be implemented as a wired interface such as an Ethernet port or as a wireless interface such as a wireless transceiver that can access a network wirelessly (e.g., using Wi-Fi or other wireless communication protocol).

Figure 9C:
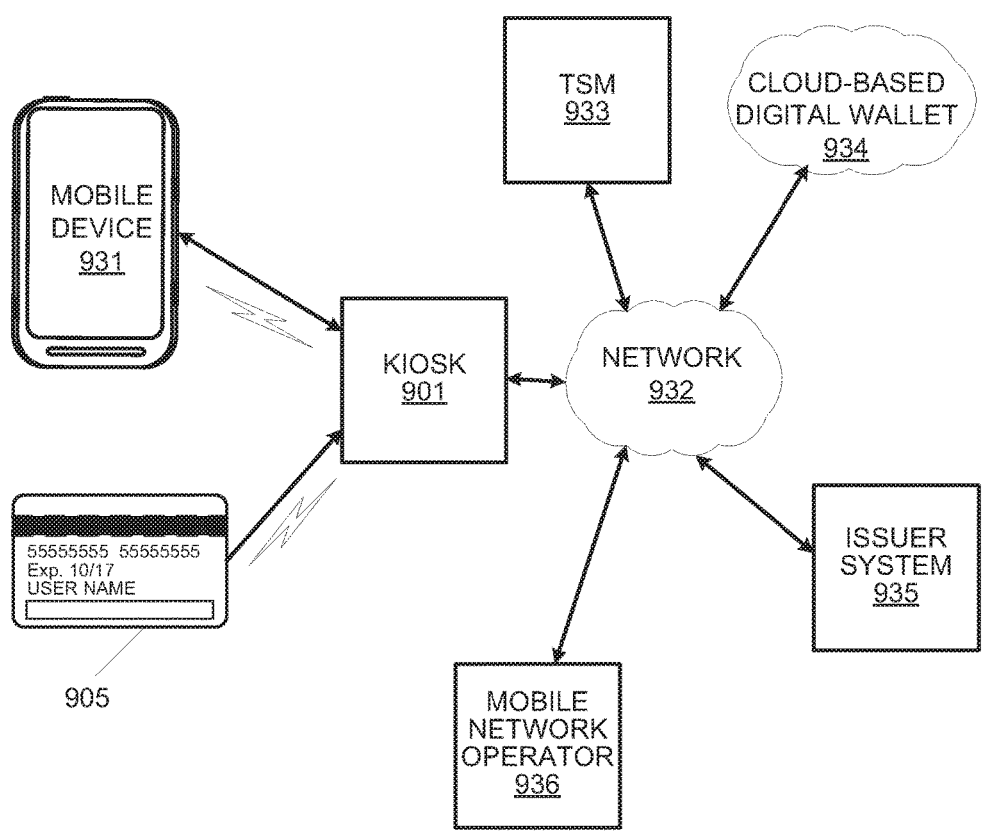
FIG. 9C is a schematic diagram of a system of the embodiment of FIG. 9A.

FIG. 9C illustrates a system (930) for provisioning a mobile device (931) with digital wallet capabilities using kiosk (901). Mobile device (931) can be a newly purchased mobile device or can be an existing mobile device that a user already owns. In some embodiments, mobile device (931) may be preloaded with a digital wallet application, and kiosk (901) is used to load credentials onto the digital wallet application of mobile device (931). In other embodiments, kiosk (901) can be used to load a digital wallet application along with personalized credentials onto mobile device (931) if mobile device (931) does not include a preloaded digital wallet application.

According to some embodiments, kiosk (901) is communicatively coupled to a trusted service manager (TSM) (933), for example, via a network (932). TSM (933) offers services to support contactless transaction services that are performed with mobile devices. The basic functionalities that may be provided by the TSM (933) include the ability to manage security keys or tokens that are used to access a mobile device's secure element (SE) chip (e.g., a secure memory chip or a secured partition of a memory) in which credentials of a digital wallet application can be stored. The SE is used by the mobile device (931) to host and store data and applications that require a high degree of security. The SE can be provided to the mobile device (931), for example, by an entity of the payment processing network such as an issuer of a credit card, by a contactless transaction service provider, by a mobile network operator (MNO), by a mobile device manufacturer, or by other suitable entities. Access to the SE of mobile device (931) can be achieved by obtaining the proper security key or token from the SE provider.

Although TSM (933) is shown as a separate entity, in some embodiments, TSM (933) may be integrated with issuer system (935) for activating and personalizing a digital wallet application with a user's credentials, or be integrated with kiosk (901). Upon request, TSM (933) may obtain the proper security key or token from a SE provider to lock or unlock the SE on mobile device (931), for example, to allow kiosk (901) to load user credentials onto the SE of mobile device (931).

Provisioning of mobile device (931) for digital wallet capabilities may be initiated when a user engages kiosk (901) by providing user input to a user input interface of kiosk (901), for example, by touching a touch screen of kiosk (901) or by pressing a key on a keyboard of kiosk (901), etc. Upon user engagement, kiosk (901) may provide visual and/or audio instructions for the user to complete the provisioning process. For example, kiosk (901) may display a message instructing the user to communicatively connect the user's mobile device (931) to kiosk (901).

To communicatively connect the user's mobile device (931) to kiosk (901), a user can physically connect mobile device (931) to the mobile device interface (e.g., a connector or cable) of kiosk (901) for a wired communication channel, or by placing mobile device (931) in close proximity to the mobile device interface (e.g., wireless transceiver) of kiosk (901) to allow an ad hoc wireless communication channel to be established between mobile device (931) and kiosk (901). The ad hoc wireless communication channel can be established via NFC, RF, Bluetooth, Wi-Fi, or other suitable wireless communication protocols. In some embodiments, when kiosk (901) senses a mobile device (931) is in close proximity, kiosk (901) may display a message asking to ask if the user grants permission for kiosk (901) to establish a wireless communication channel with mobile device (931).

Once a communication channel (wired or wireless) is established between mobile device (931) and kiosk (901), kiosk (901) may provide further visual and/or audio instructions to the user to present a credential storage instrument (905) to continue with the digital wallet provisioning process. For example, kiosk (901) may instruct the user to place credential storage instrument (905) in physical contact with the credential storage instrument reader of kiosk (901) (e.g., by swiping or inserting a magnetic stripe card into a magnetic stripe reader, or by inserting a chip-card into a chip-card reader slot), or to place credential storage instrument (905) in close proximity with the credential storage instrument reader of kiosk (901) (e.g., by placing a contactless card in close proximity to a contactless card reader, or by placing a printed medium with a bar code or QR code in front of an infrared scanner). Upon presenting credential storage instrument (905) to the credential storage instrument reader of kiosk (901), kiosk (901) accesses the credential storage instrument (905) to read user credentials from credential storage instrument (905).

It should be noted that although in the above process, a communication channel between mobile device (931) and kiosk (901) is established first before a credential storage instrument is presented to kiosk (901), in some embodiments, a credential storage instrument can be presented to kiosk (901) prior to communicatively connecting mobile device (931) to kiosk (901). Furthermore, in addition to providing user input on the user input interface of kiosk (901) to initiate the process, the digital wallet provisioning process can alternatively be initiated by simply communicatively connecting mobile device (931) to kiosk (901) or by presenting a credential storage instrument to kiosk (901).

Once kiosk (901) has retrieve user credentials from credential storage instrument (905), kiosk (901) may carry out a verification process to confirm that the user is authorized to provision mobile device (931) with credentials from credential storage instrument (905). In some embodiments, the verification process may be carried out by kiosk (901) without requiring any additional user input. For example, kiosk (901) may retrieve a mobile phone number and/or a mobile device identifier from mobile device (931) that can be used to look up the mobile subscriber name associated with mobile device (931) from mobile network operator (936). Kiosk (901) may also retrieve the name on credential storage instrument (905), or look up the name associated with the credential storage instrument (905) using credentials retrieved from credential storage instrument (905) by contacting issuer system (935). If the mobile subscriber name matches the user name of the credential storage instrument (905), it can be assumed that the user is the proper owner of both mobile device (931) and credential storage instrument (905), and that the user is authorized to provision mobile device (931) with credentials from credential storage instrument (905).

It should be noted that embodiments of the present invention provide a more secure method of provisioning mobile device (931) as compared to some over-the-air (OTA) provisioning processes, because credential storage instrument (905) is in physical possession of the user during the kiosk provisioning process. This can prevent, for example, a fraudulent user from provisioning a mobile device with stolen credentials when the fraudulent user does not have physical possession of the credential storage instrument.

In some embodiments, for additional security, before proceeding further with the provisioning process, kiosk (901) may request the user to enter a PIN number associated with credential storage instrument (905) to authenticate the user. Kiosk (901) may alternatively or additionally request the user to login to an online account provided by an issuer of the credential storage instrument (905) via a web-enable browser, and/or request the user to login to an online account provided by the mobile network operator of mobile device (931).

After kiosk (901) determines that the user is authorized to provision mobile device (931) with credentials from credential storage instrument (905), kiosk (901) may send a registration or activation request to TSM (933). In some embodiments, the registration or activation request is sent with the appropriate personalization data (e.g., credentials retrieved from credential storage instrument (905)). TSM (933) may process the registration or activation request by personalizing a digital wallet application with the appropriate personalization data, unlock the SE of mobile device (931), and providing the personalized digital wallet application to kiosk (901) for download to mobile device (931). In some embodiments, for example, in which mobile device (931) includes a preload digital wallet application, TSM (933) may process the request by unlocking the SE of mobile device (931) to allow kiosk (901) to transfer credentials retrieved from credential storage instrument (905) onto the SE of mobile device (931). According to some embodiments, some or all of the functionality performed by TSM (9) can be integrated into kiosk (901).

Depending on the type of credential storage instrument (905) being used, additional credentials that are not stored on credential storage instrument (905), or additional credentials that cannot be read by the credential storage instrument reader of kiosk (901) may be needed to enable mobile device (931) to perform contactless transactions. For example, if credential storage instrument (905) is a credit card, a dynamic card verification value (dCVV) may be required to conduct contactless payment transactions carried out by mobile device (931). In such embodiments, during the digital wallet provisioning process, kiosk (901) may send a registration or activation request to issuer system (935) to obtain additional credentials such as a dCVV software that can be used by mobile device (931) to generate a dCVV when performing contactless payment transactions. The additional credentials (e.g., dCVV software) obtained from issuer system (935) can be stored in SE of mobile device (931) along with credentials retrieved from credential storage instrument (905) during the digital wallet provisioning process. In some embodiments, the credentials retrieved from credential storage instrument (905) may also be modified or augmented by issuer system (935) before being stored in mobile device (931). Credentials loaded into the SE of mobile device (931) by kiosk (901) may also use data encryption standards such as, e.g., RSA with a key of at least 1024 bits, triple data encryption standard (DES), 128-bit advanced encryption standard (AES), an RC4 stream encryption algorithm using minimum 128-bit key length, etc.

Once credentials from credential storage instrument (905) has been loaded onto a digital wallet application of mobile device (931), kiosk (901) may provide visual and/or audio instructions asking the user if the user wishes to load credentials from addition credential storage instruments onto mobile device (931). If so, the process described above can be repeated for each credential storage instrument. In some embodiments, the credential storage instruments can be processed in batch mode. For example, kiosk (901) may allow a user to swipe multiple credential storage instruments first before kiosk (901) begins loading the respective credentials onto mobile device (931). Credentials from the multiple credential storage instruments can be stored temporarily in kiosk (901), and once the user has presented the desired number of credential storage instruments to kiosk (901), kiosk (901) then begins the provisioning process of loading the credentials onto mobile device (931).

According to some embodiments, kiosk (901) can also be used to transfer credentials from one digital wallet application to another. For example, when a user purchases a new mobile device, the user may already have a personalized digital wallet application on the user's old mobile device. The user may want to transfer the credentials stored on the old mobile device to the new one. Instead of presenting individual credential storage instruments for kiosk (901) to read, the user may place the user's old mobile device in close proximity to the credential storage instrument reader of kiosk (901). Kiosk (901) may then access the digital wallet application stored on the old mobile device to retrieve the credentials stored therein. After retrieving the credentials from the old mobile device, kiosk (901) can provision the new mobile device with the retrieved credentials using the process described above.

In addition to or as an alternative to provisioning mobile device (931), kiosk (901) may also load credentials into a cloud-based digital wallet (934). Cloud-based digital wallet (934) allows credentials to be stored in network-accessible storage that is external to mobile device (931). Using cloud-based digital wallet (934) has the advantage that once the credentials have been loaded to cloud-based digital wallet (934), the user can avoid having to transfer the credentials to a new mobile device each time the user switches mobile devices. Thus, in some embodiments, a user may use kiosk (901) to load credentials from credential storage instruments into cloud-based digital wallet (934) without the presence of a mobile device.

In some embodiments, kiosk (901) may perform additional digital wallet management functions. For example, once the digital wallet application on mobile device (931) has been provisioned and personalized, kiosk (901) may allow a user to purchase digital media for mobile device (931) using credentials loaded onto the digital wallet application. Kiosk (901) may also allow a user to deposit or add value into accounts associated with the credentials stored in the digital wallet application. For example, kiosk (901) may allow the user to add value to a transit fare account stored in the digital wallet application. However, it should be note that these additional functions are different from the digital wallet provisioning process in that these additional functions required the digital wallet application to have the necessary credentials before these functions can be performed. In contrast, the provisioning process described herein is used to provide the mobile device with credentials that the digital wallet application lacked prior to being provisioned by kiosk (901). Kiosks according to embodiments of the invention may or may not provide the aforementioned additional functions.

Figure 9D:
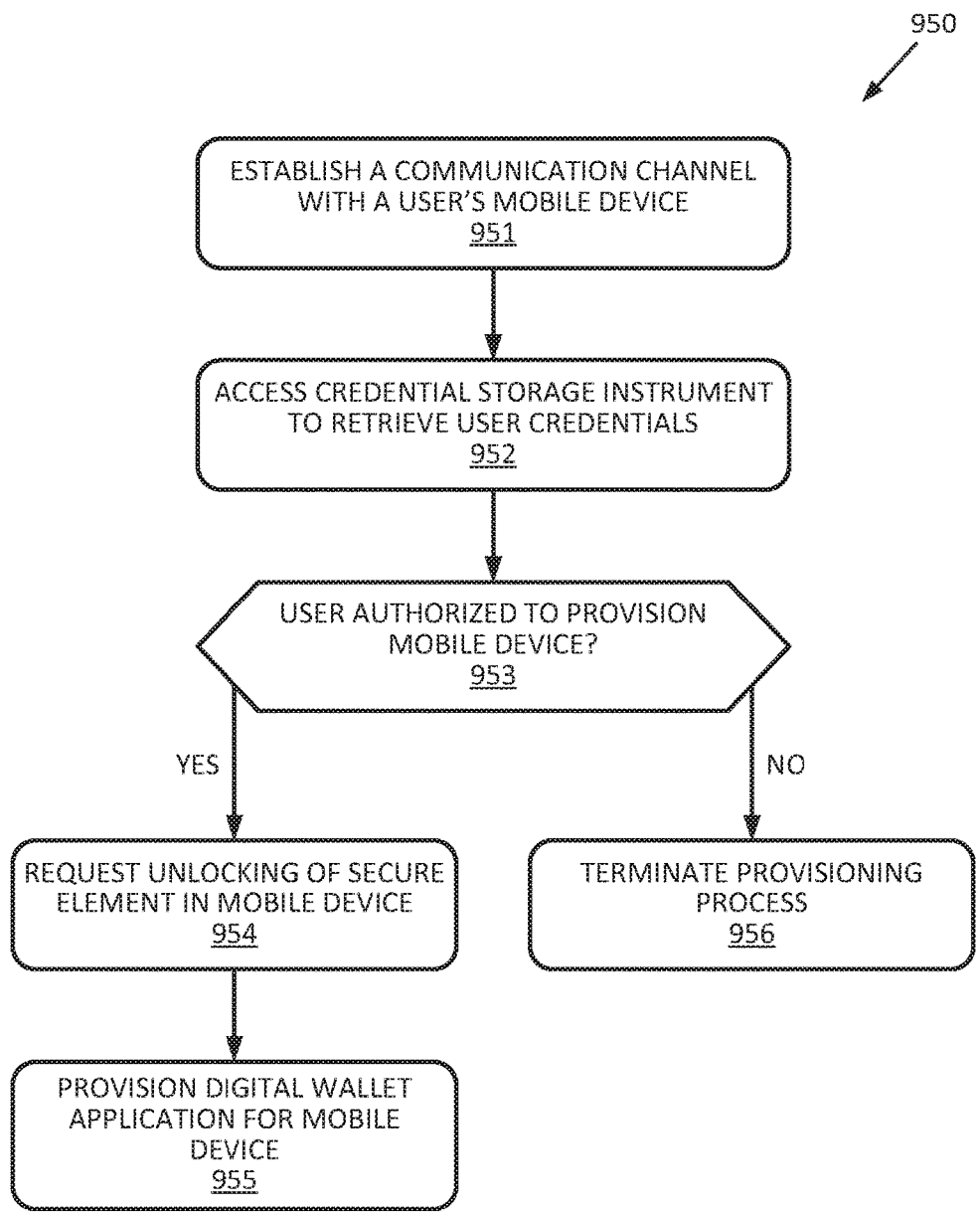
FIG. 9D is a flow diagram of a method of the embodiment of FIG. 9A.

FIG. 9D illustrates a flow diagram of a method (950) performed by a kiosk or other suitable computing devices for provisioning a digital wallet application of a mobile device according to some embodiments. At block (951), a communication channel is established between a user's mobile device. The communication channel can be a wired connection or a wireless connection as described above. At block (952), a credential storage instrument such as a magnetic stripe card, a chip card, or other credential storage instruments described above is accessed to retrieve credentials stored in the credential storage instrument. At block (953), it is determined whether the user is authorized to provision a digital wallet application for the mobile device with the retrieved credentials. This determination can be made according to any of the processes described above. If it is determined that the user is not authorized, at block (956), the process is terminated without provisioning the mobile device. If it is determined that the user is authorized, then at block (954), a request is made to unlock the secure element (SE) of the mobile device. The SE may be unlocked with a security key or token provided by a TSM or by a kiosk with integrated TSM functionality. Once the SE of the mobile device is unlocked, a digital wallet application for the mobile device is provisioned by loading the user credentials retrieved from the credential storage instrument into the SE. In some embodiments, the user credentials may be modified, augmented (e.g., with a CVV2), and/or encrypted before being stored into the SE of the mobile device. Method (950) can be repeated for multiple credential storage instruments. Subsequent to the provisioning process, the SE of mobile device is locked to prevent unauthorized access.

It should be understood that method (950) for provisioning a digital wallet application of a mobile device can include additional operations that are not depicted in FIG. 9D, or may include less operations in other embodiments. Furthermore, some of the operations may be performed in a different order than what is depicted.

Figure 10:
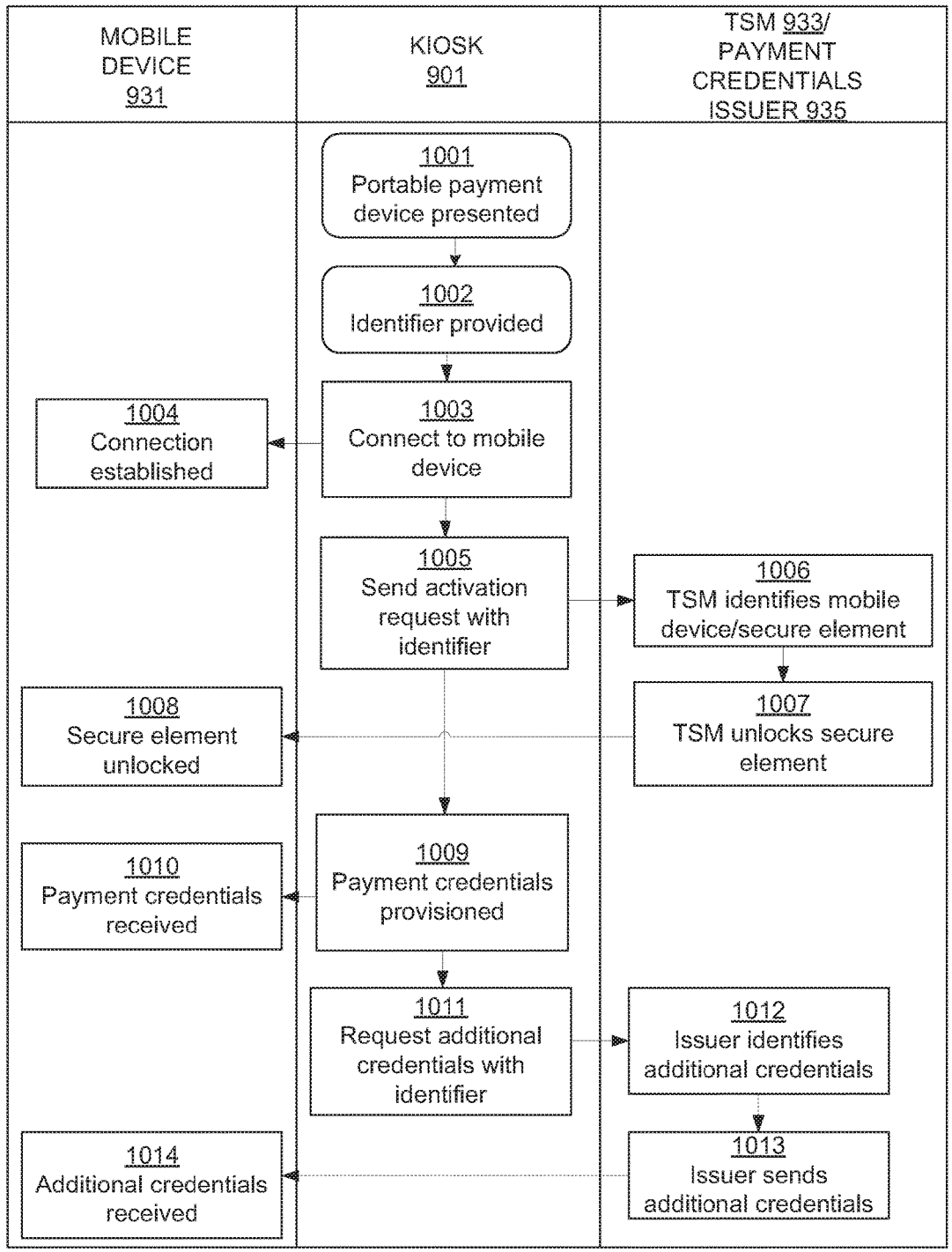
FIG. 10 is a swim-lane flow diagram of the embodiment of FIG. 9A.

FIG. 10 shows a swim-lane flow diagram illustrating the flow between a mobile device (931), a kiosk (901), and a remotely accessible server such as a payment credentials issuer (935) or a TSM (933) according to embodiments.

A consumer may present (1001) his portable payment device or credential storage instrument (for example, a payment card) at the kiosk which may extract payment credentials from the portable payment device. For example, the consumer may insert his payment card into a kiosk and a "credential transfer" transaction may be requested. The consumer may be prompted for his payment card PIN which may be entered into the kiosk via a keypad. The consumer may also provide (1002) an identifier, for example, the kiosk may also prompt the consumer for an "alias" which is used as an identifier for the consumer and his mobile device.

The kiosk may connect (1003) to the consumer's mobile device as previously described to establish (1004) a connection. The kiosk may use the consumer's provided identifier to identify the mobile device for connection, for example, if this is in a contactless manner.

The kiosk may send (1005) an activation request to a remotely accessible server provided by a TSM in order to obtain authorization to store the payment credentials at the secure element associated with the mobile device and also to unlock the secure element. The activation request may use the identifier provided by the consumer which may be registered for the consumer's mobile device and/or secure element and the identifier may be used to identify (1006) the mobile device and its secure element. The TSM may unlock (1007/1008) the secure element associated with the mobile device.

The payment credentials may be provisioned (1009/1010) to the secure element of the mobile device using the connection to the kiosk. These may be provisioned securely to the secure element.

Additional credentials that are not stored on the portable payment device may be needed to also be stored at the secure element to enable the mobile device to perform contactless transactions. For example, a dynamic card verification value (dCVV) may be required to conduct contactless payment transactions carried out by mobile device. In such embodiments, the kiosk may send a registration request (1011) to a remotely accessible server of an issuer system to obtain additional credentials. The identifier may be included in the request and used by the remotely accessible server to identify (1012) the correct additional credentials. The additional credentials may be, in one example, dCVV software that can be used by mobile device to generate a dCVV when performing contactless payment transactions. The registration request may include the identifier provided by the consumer in order to obtain the correct additional credentials for the consumer's portable payment device.

The additional credentials (e.g., dCVV software) obtained from issuer system can transmitted (1013/1014) to and stored in the secure element associated with the mobile device along with payment credentials retrieved from the kiosk during the digital wallet provisioning process. Alternatively, the additional credentials may be communicated directly to the secure element of the mobile device.

Figure 11:
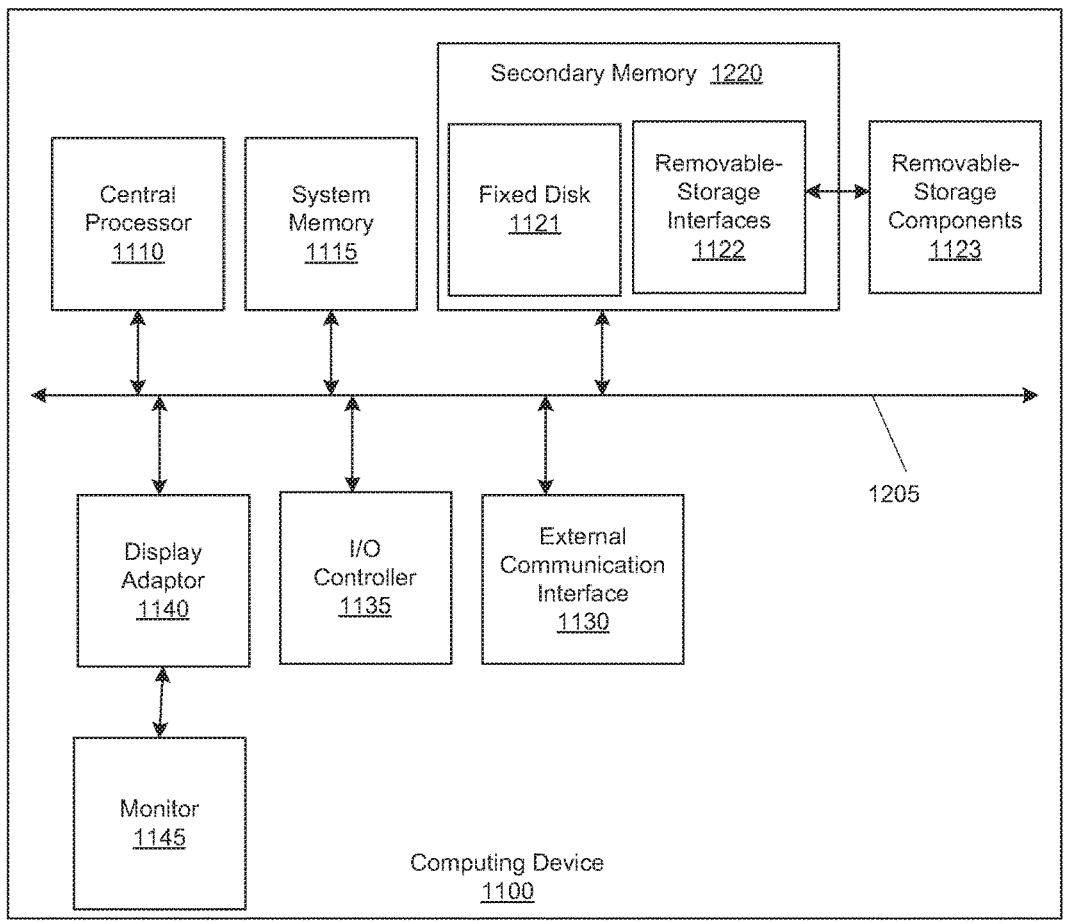
FIG. 11 illustrates a block diagram of a computing device in which various aspects of the invention may be implemented.

FIG. 11 illustrates an example of a computing device (1100) in which various aspects of the disclosure may be implemented. The computing device (1100) may be suitable for storing and executing computer program code. The various participants and elements in the previously described system diagrams may use any suitable number of subsystems or components of the computing device (1100) to facilitate the functions described herein.

The computing device (1100) may include subsystems or components interconnected via a communication infrastructure (1105) (for example, a communications bus, a crossover bar device, or a network). The computing device (1100) may include at least one central processor (1110) and at least one memory component in the form of computer-readable media.

The memory components may include system memory (1115), which may include read only memory (ROM) and random access memory (RAM). A basic input/output system (BIOS) may be stored in ROM. System software may be stored in the system memory (1115) including operating system software.

The memory components may also include secondary memory (1120). The secondary memory (1120) may include a fixed disk (1121), such as a hard disk drive, and, optionally, one or more removable-storage interfaces (1122) for removable-storage components (1123).

The removable-storage interfaces (1122) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (1122) may also be in the form of ports or sockets for interfacing with other forms of removable-storage components (1123) such as a flash memory drive, external hard drive, or removable memory chip, etc.

The computing device (1100) may include an external communications interface (1130) for operation of the computing device (1100) in a networked environment enabling transfer of data between multiple computing devices (1100). Data transferred via the external communications interface (1130) may be in the form of signals, which may be electronic, electromagnetic, optical, radio, or other types of signal.

The external communications interface (1130) may enable communication of data between the computing device (1100) and other computing devices including servers and external storage facilities. Web services may be accessible by the computing device (1100) via the communications interface (1130).

The external communications interface (1130) may also enable other forms of communication to and from the computing device (1100) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (1110).

A computer program product may be provided by a non-transient computer-readable medium, or may be provided via a signal or other transient means via the communications interface (1130).

Interconnection via the communication infrastructure (1105) allows a central processor (1110) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (1100) either directly or via an I/O controller (1135). These components may be connected to the computing device (1100) by any number of means known in the art, such as a serial port.

One or more monitors (1145) may be coupled via a display or video adapter (1140) to the computing device (1100).

Figure 12:
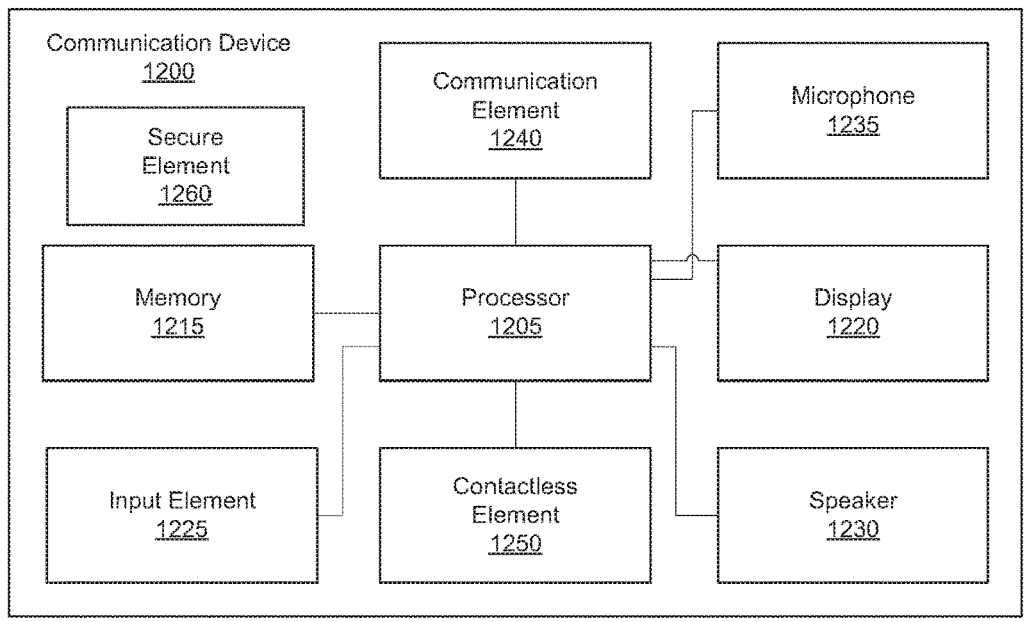
FIG. 12 illustrates a block diagram of a communication device that can be used in various embodiments of the invention.

FIG. 12 shows a block diagram of a communication device (1200) that may be used in embodiments of the disclosure. The communication device (1200) may be a cell phone, a feature phone, a smart phone, a satellite phone, or a computing device having a phone capability.

The communication device (1200) may include a processor (1205) (e.g., a microprocessor) for processing the functions of the communication device (1200) and a display (1220) to allow a user to see the phone numbers and other information and messages. The communication device (1200) may further include an input element (1225) to allow a user to input information into the device (e.g., input buttons, touch screen, etc.), a speaker (1230) to allow the user to hear voice communication, music, etc., and a microphone (1235) to allow the user to transmit his or her voice through the communication device (1200).

The processor (1210) of the communication device (1200) may connect to a memory (1215). The memory (1215) may be in the form of a computer-readable medium that stores data and, optionally, computer-executable instructions. The memory (1215).

The communication device (1200) may also include a communication element (1240) for connection to communication channels (e.g., a cellular telephone network, data transmission network, Wi-Fi network, satellite-phone network, Internet network, Satellite Internet Network, etc.). The communication element (1240) may include an associated wireless transfer element, such as an antenna.

The communication element (1240) may include a subscriber identity module (SIM) in the form of an integrated circuit that stores an international mobile subscriber identity and the related key used to identify and authenticate a subscriber using the communication device (1200). One or more subscriber identity modules may be removable from the communication device (1200) or embedded in the communication device (1200).

The communication device (1200) may further include a contactless element (1250), which is typically implemented in the form of a semiconductor chip (or other data storage element) with an associated wireless transfer element, such as an antenna. The contactless element (1250) may be associated with (e.g., embedded within) the communication device (1200) and data or control instructions transmitted via a cellular network may be applied to the contactless element (1250) by means of a contactless element interface (not shown). The contactless element interface may function to permit the exchange of data and/or control instructions between mobile device circuitry (and hence the cellular network) and the contactless element (1250).

The contactless element (1250) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (1200) and an interrogation device. Thus, the communication device (1200) may be capable of communicating and transferring data and/or control instructions via both a cellular network and near field communications capability.

Communication devices (1200) that support mobile contactless payments typically support contactless transactions using the EMV contactless communication protocol (EMV-CCP), which is based on ISO 14443, in order to interact with merchant access devices. This capability is typically met by implementing NFC. The NFC capability on communication device (1200) might be enabled by an embedded NFC chip or by the addition of an external memory card or accessory that contains the NFC chip. Additionally, communication device (1200) typically includes a secure element (SE) (1260) either embedded in the handset or in the subscriber identity module (SIM) card. The SE (1260) can also be included in an add-on device such as a micro-Secure Digital (microSD) card, or an expansion component for adding to a communication component of the communication device (1200).

The data stored in the memory (1215) may include: operation data relating to the operation of the communication device (1200), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (1200) to selected receivers.

The communication device (1200) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising the steps of:
receiving, at a remote server computer, a request for payment credentials from a receiving device;
receiving, by the remote server computer from the receiving device, a personal identifier entered by a consumer;
identifying, by the remote server computer, a previously registered communication address of a mobile device or a secure element associated with the mobile device corresponding to the personal identifier;
communicating, by the remote server computer, a request for a decryption key to an identified communication address of the mobile device or the secure element associated with the mobile device;
receiving, by the remote server computer from the mobile device, the decryption key;
decrypting, by the remote server computer encrypted payment credentials stored by the remote server computer; and
transmitting, by the remote server computer, the decrypted payment credentials to the receiving device.

2. The method as claimed in claim 1, including:
storing the encrypted payment credentials at the remote server computer.

3. The method as claimed in claim 1, including:
requesting authorization from a trusted service manager to access the secure element; and
receiving a security key to access the secure element.

4. The method as claimed in claim 1, including:
communicating additional credentials to the receiving device, wherein the additional credentials are required in use in addition to the payment credentials or derivation of the payment credentials to carry out a transaction.

5. The method as claimed in claim 4, including:
obtaining the additional credentials from a remotely accessible server using the personal identifier and forwarding the additional credentials to the receiving device.

6. The method as claimed in claim 4, wherein the additional credentials are in the form of one or more dynamic verification values.

7. The method as claimed in claim 1, wherein the decrypted payment credentials are transmitted to the receiving device in a single secure transaction message.

8. The method as claimed in claim 1, wherein the method further includes:
determining whether or not the mobile device or the secure element corresponding to the personal identifier has been registered with the remote server computer.

9. The method as claimed in claim 1,
wherein the secure element is one of the group of: a secure element provided in the mobile device, a secure element embedded in a layer which sits between a communication component of the mobile device and a communication component interface of the mobile device, a secure element provided in a communication component of the mobile device, and a cloud-based secure element associated with the mobile device.

10. The method as claimed in claim 1, wherein the method is repeated for multiple payment credentials.

11. The method as claimed in claim 1, wherein the payment credentials are also on a portable payment device used by a user of the mobile device.

12. A remote server computer comprising:
a processor; and
a non-transitory computer readable medium coupled to the processor, the computer readable medium comprising code, executable by the processor for implementing a method comprising:
receiving, a request for payment credentials from a receiving device;
receiving, from the receiving device, a personal identifier entered by a consumer;
identifying a previously registered communication address of a mobile device or a secure element associated with the mobile device corresponding to the personal identifier;

communicating a request for a decryption key to an identified communication address of the mobile device or the secure element associated with the mobile device;

receiving, by the remote server computer from the mobile device, the decryption key;

decrypting, by the remote server computer encrypted payment credentials stored by the remote server computer; and transmitting, by the remote server computer, the decrypted payment credentials to the receiving device.

13. The server computer of claim 12, wherein the method comprises storing the encrypted payment credentials.

14. The server computer of claim 12, wherein the decrypted payment credentials are transmitted to the receiving device in a single secure transaction message.

15. The server computer of claim 12, wherein the method further includes:

determining whether or not the mobile device or the secure element corresponding to the personal identifier has been registered with the server computer.

16. The server computer of claim 12, wherein the secure element is one of the group of: a secure element provided in the mobile device, a secure element embedded in a layer which sits between a communication component of the mobile device and a communication component interface of the mobile device, a secure element provided in a communication component of the mobile device, and a cloud-based secure element associated with the mobile device.

17. The server computer of claim 12, wherein the method is repeated for multiple payment credentials.

* * * * *

UNITED STATES PATENT AND TRADEMARK OFFICE
CERTIFICATE OF CORRECTION

PATENT NO. : 10,198,728 B2
APPLICATION NO. : 14/889714
DATED : February 5, 2019
INVENTOR(S) : Horatio Nelson Huxham et al.

Page 1 of 1

It is certified that error appears in the above-identified patent and that said Letters Patent is hereby corrected as shown below:

Column 32, Line 5 delete "computer encrypted" and insert -- computer, encrypted --

Column 33, Line 7 delete "computer encrypted" and insert -- computer, encrypted --

Signed and Sealed this
Fourth Day of June, 2019

Andrei Iancu
*Director of the United States Patent and Trademark Office*